United States Patent
Hasegawa et al.

(10) Patent No.: US 11,927,775 B2
(45) Date of Patent: Mar. 12, 2024

(54) 3D GLASSES, OPTICAL DEVICE, AND THREE-DIMENSIONAL IMAGE DISPLAY DEVICE

(71) Applicant: Sharp Display Technology Corporation, Mie (JP)

(72) Inventors: Masahiro Hasegawa, Kameyama (JP); Akira Sakai, Kameyama (JP); Kiyoshi Minoura, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/134,504

(22) Filed: Apr. 13, 2023

(65) Prior Publication Data
US 2023/0333402 A1    Oct. 19, 2023

(30) Foreign Application Priority Data
Apr. 15, 2022   (JP) .................................. 2022-067728

(51) Int. Cl.
| | | |
|---|---|---|
| *G02B 30/24* | (2020.01) | |
| *G02B 30/25* | (2020.01) | |
| *G02F 1/1335* | (2006.01) | |
| *G02F 1/13363* | (2006.01) | |
| *G02F 1/1347* | (2006.01) | |
| *G02C 11/00* | (2006.01) | |

(52) U.S. Cl.
CPC .............. *G02B 30/24* (2020.01); *G02B 30/25* (2020.01); *G02F 1/133528* (2013.01); *G02F 1/133634* (2013.01); *G02F 1/133638* (2021.01); *G02F 1/1347* (2013.01); *G02C 11/10* (2013.01); *G02F 2413/04* (2013.01); *G02F 2413/13* (2013.01); *G02F 2413/14* (2013.01)

(58) Field of Classification Search
CPC ... G02B 30/24; G02B 30/25; G02F 1/133638; G02F 1/133528; G02F 1/133634; G02F 1/1347; G02F 2413/04; G02F 2413/13; G02F 2413/14; G02C 11/10
USPC .......................................................... 349/13
See application file for complete search history.

(56) References Cited

U.S. PATENT DOCUMENTS

| | | | |
|---|---|---|---|
| 2012/0092764 A1* | 4/2012 | Fukutomi | .............. G02B 30/25 359/465 |
| 2012/0099033 A1 | 4/2012 | Ishiguro | |

FOREIGN PATENT DOCUMENTS

JP             5677902 B2     2/2015

* cited by examiner

*Primary Examiner* — Edward J Glick
*Assistant Examiner* — William D Peterson
(74) *Attorney, Agent, or Firm* — ScienBiziP, P.C.

(57) ABSTRACT

Provided are 3D glasses capable of reducing crosstalk when disposed on the viewer side of a liquid crystal panel that is time-divisionally driven; an optical device including the 3D glasses; and a three-dimensional image display device including the optical device. The 3D glasses include a right-eye polarizer and a left-eye polarizer, the right-eye polarizer and the left-eye polarizer each including a polarizing plate and a first λ/4 plate, at least one of the right-eye polarizer or the left-eye polarizer including a phase difference layer on or behind a back surface side of the polarizing plate, wherein a phase difference introduced by the right-eye polarizer in a thickness direction at a wavelength of 550 nm is different from a phase difference introduced by the left-eye polarizer in the thickness direction at a wavelength of 550 nm.

8 Claims, 15 Drawing Sheets

Example 1

Example 1

Example 2

Example 2

Example 3

Example 3

Example 4

Example 4

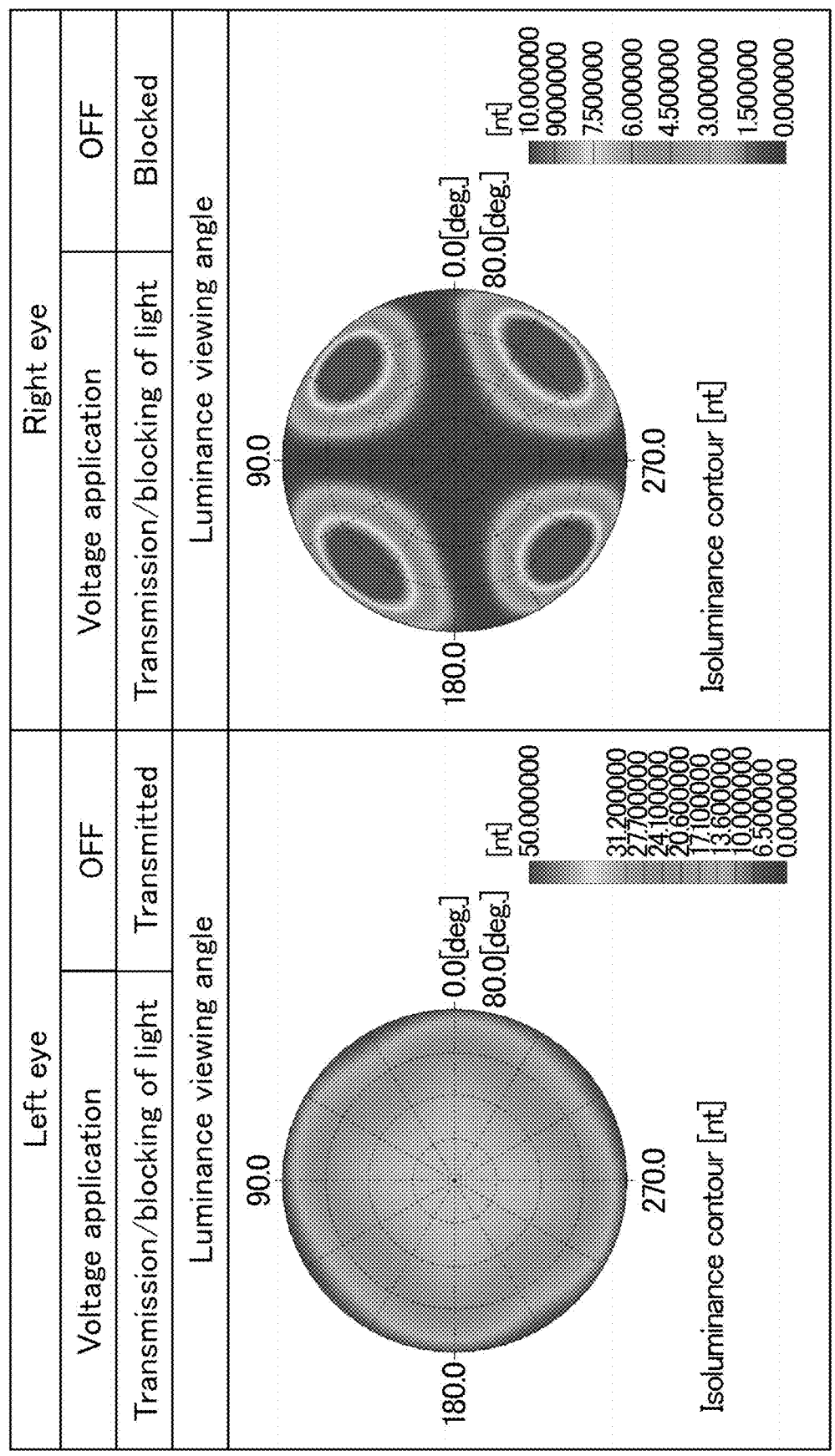
FIG. 18 Comparative Example 1

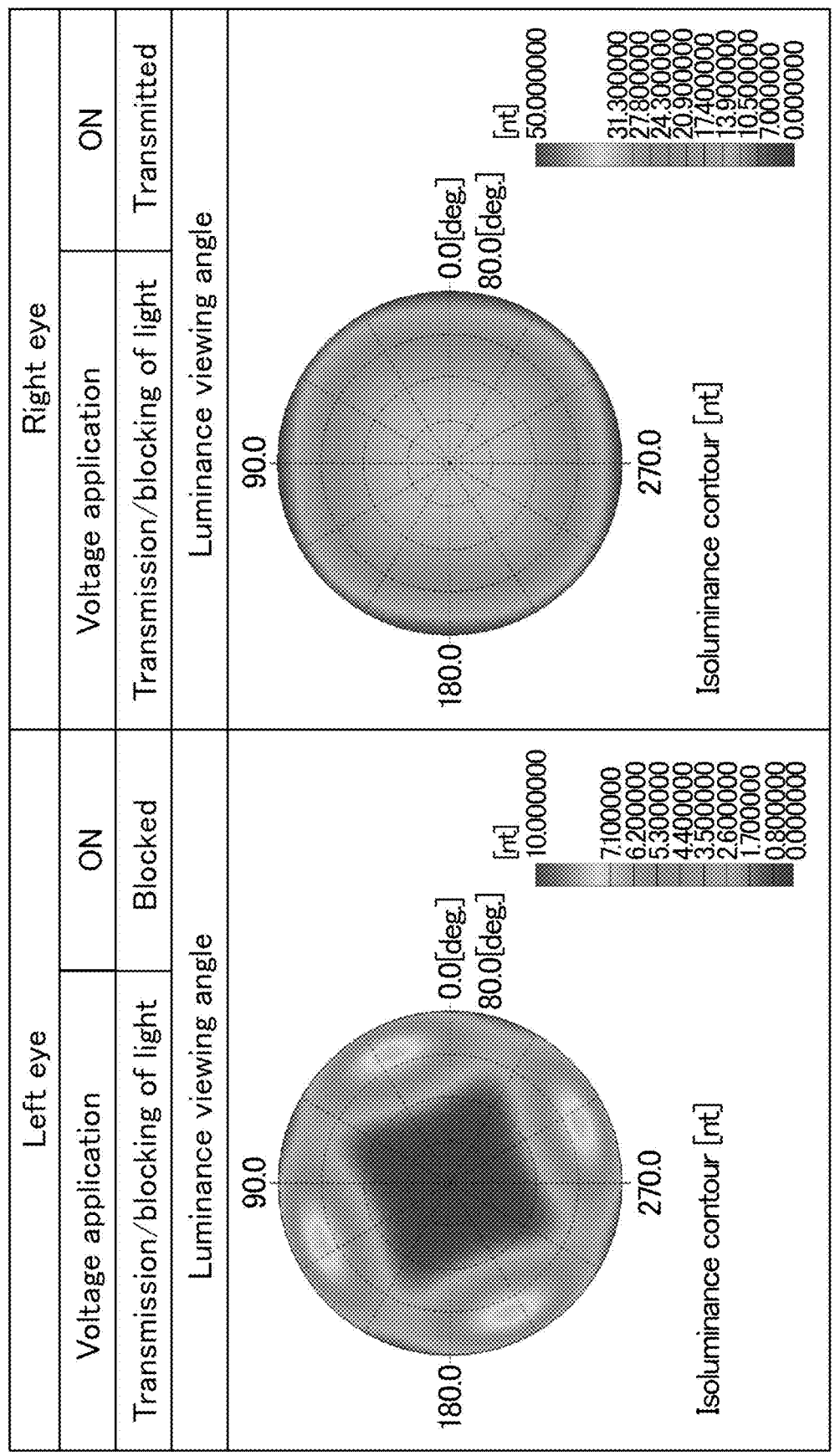
FIG. 19  Comparative Example 1

3D GLASSES, OPTICAL DEVICE, AND THREE-DIMENSIONAL IMAGE DISPLAY DEVICE

CROSS-REFERENCE TO RELATED APPLICATIONS

The present application claims priority under 35 U.S.C. § 119 to Japanese Patent Application No. 2022-067728 filed on Apr. 15, 2022, the contents of which are incorporated herein by reference in their entirety.

BACKGROUND OF THE INVENTION

Field of the Invention

The following disclosure relates to 3D glasses, an optical device including the 3D glasses, and a three-dimensional image display device including the optical device.

Description of Related Art

A stereoscopic image display device has been examined that includes a display device including a liquid crystal cell that blocks images time-divisionally, as well as a polarizer including a polarizing plate and a λ/4 plate to enable visual recognition of a stereoscopic image (3D image).

For example, JP 5677902 B discloses a stereoscopic image recognition apparatus comprising: a liquid crystal display I that comprises a first liquid crystal cell and a pair of polarizing plates interposing the first liquid crystal cell therebetween, one of the polarizing plates being a display side polarizing plate on a display side of the first liquid crystal cell; and a time division image display shutter II that comprises a second liquid crystal cell and that is disposed between a display surface of the liquid crystal display I and a viewer, wherein the liquid crystal display I includes a λ/4 plate A in a protection region for the display side polarizing plate, the protection region being a region on the display side of a polarizer of the display side polarizing plate, wherein an angle formed by an absorption axis of the display side polarizing plate and a slow axis of the λ/4 plate A is 35° to 55° or 125° to 145°, the protection region satisfies the following Expression (I), and the protection region has an absorptivity of 0.06 or more at 380 mm, wherein the time division image display shutter II includes at least one polarizing plate C between the second liquid crystal cell and the viewer and includes a λ/4 plate B between the polarizing plate C and the liquid crystal display I, and wherein when the absorption axis of the display side polarizing plate and the absorption axis of the polarizing plate C are disposed so as to be perpendicular or parallel to each other, the slow axes of the λ/4 plate A and the λ/4 plate B are perpendicular or parallel to each other:

$$|Rth(550)| \leq 160 \text{ nm} \quad (I)$$

wherein Rth (λ) is a retardation (nm) in a thickness direction at a wavelength λ nm.

BRIEF SUMMARY OF THE INVENTION

A method of displaying a three-dimensional image has been suggested. The method includes, in a display device including a stack of two liquid crystal panels, alternately displaying an image intended for the right eye (right-eye image) and an image intended for the left eye (left-eye image) on a back surface side liquid crystal panel, time-divisionally controlling a viewer side liquid crystal panel according to display of the right-eye image and the left-eye image, and causing the right-eye image and the left-eye image to be separately perceived through polarizing glasses (3D glasses). Such a display device that time-divisionally presents different images to the left and right eyes to create a sense of depth is also called an active retarder-type three-dimensional image display device.

The active retarder-type three-dimensional image display device causes what is called a crosstalk phenomenon where the right eye sees a combination of a right-eye image and (some of) a left-eye image or the left eye sees a combination of a left-eye image and (some of) a right-eye image, so that the sense of depth is lost.

The time division image display shutter II in JP 5677902 B includes an ECB-mode liquid crystal cell configured to introduce a phase difference of λ/2, and combination of turning on/off of the liquid crystal cells and the λ/4 plate A allows the polarization state of emitted light to be switched between right-handed circular polarization and left-handed circular polarization. The present inventors have found that the method of switching transmission/non-transmission of light to the human eye using a combination of the λ/4 plate B and the polarizing plate C described in JP 5677902 B narrows the viewing angle for either the left or right eye, leading to occurrence of crosstalk.

In response to the above issues, an object of the present invention is to provide 3D glasses capable of reducing crosstalk when disposed on the viewer side of a liquid crystal panel that is time-divisionally driven; an optical device including the 3D glasses; and a three-dimensional image display device including the optical device.

(1) One embodiment of the present invention is directed to 3D glasses including a right-eye polarizer and a left-eye polarizer, the right-eye polarizer and the left-eye polarizer each including a polarizing plate and a first λ/4 plate, at least one of the right-eye polarizer or the left-eye polarizer including a phase difference layer on or behind a back surface side of the polarizing plate, wherein a phase difference introduced by the right-eye polarizer in a thickness direction at a wavelength of 550 nm is different from a phase difference introduced by the left-eye polarizer in the thickness direction at a wavelength of 550 nm.

(2) In an embodiment of the present invention, the 3D glasses include the structure (1), and the right-eye polarizer and the left-eye polarizer satisfy the following formula (1):

$$|Rth_1 - Rth_2| \geq 120 \text{ nm} \quad (1)$$

where $Rth_1$ is the phase difference introduced by the right-eye polarizer or the left-eye polarizer in the thickness direction at a wavelength of 550 nm, whichever is greater; $Rth_2$ is the phase difference introduced by the right-eye polarizer or the left-eye polarizer in the thickness direction at a wavelength of 550 nm, whichever is smaller; and $Rth_1 > Rth_2$.

(3) In an embodiment of the present invention, the 3D glasses include the structure (1) or (2), the right-eye polarizer and the left-eye polarizer each include the phase difference layer, and a phase difference introduced by the phase difference layer in the right-eye polarizer in the thickness direction at a wavelength of 550 nm has a value with a sign different from a sign of a value of a phase difference introduced by the phase difference layer in the left-eye polarizer in the thickness direction at a wavelength of 550 nm.

(4) In an embodiment of the present invention, the 3D glasses include the structure (3), one of the phase difference layer in the right-eye polarizer and the phase difference layer in the left-eye polarizer is a positive C plate that provides a phase difference of 80 to 140 nm in absolute value in the thickness direction at a wavelength of 550 nm, and the other is a negative C plate that provides a phase difference of 20 to 120 nm in absolute value in the thickness direction at a wavelength of 550 nm.

(5) In an embodiment of the present invention, the 3D glasses include the structure (1) or (2), and one of the right-eye polarizer and the left-eye polarizer alone includes the phase difference layer.

(6) Another embodiment of the present invention is directed to an optical device including: the 3D glasses including the structure (1) or (2); and a liquid crystal shutter on or behind a back surface side of the 3D glasses, the liquid crystal shutter including a liquid crystal panel that is time-divisionally driven and a second λ/4 plate on a back surface side of the liquid crystal panel.

(7) Still another embodiment of the present invention is directed to a three-dimensional image display device including: the optical device including the structure (6); and an image display device on or behind a back surface side of the optical device, the image display device including a pair of polarizing plates and an image-displaying panel sandwiched between the pair of polarizing plates.

The present invention can provide 3D glasses capable of reducing crosstalk when disposed on the viewer side of a liquid crystal panel that is time-divisionally driven; an optical device including the 3D glasses; and a three-dimensional image display device including the optical device.

BRIEF DESCRIPTION OF THE DRAWINGS

FIG. 18 includes a contour plot showing the luminance viewing angle for the right eye and a contour plot showing the luminance viewing angle for the left eye, with the liquid crystal shutter turned off in Comparative Example 1.

FIG. 19 includes a contour plot showing the luminance viewing angle for the right eye and a contour plot showing the luminance viewing angle for the left eye, with the liquid crystal shutter turned on in Comparative Example 1.

DETAILED DESCRIPTION OF THE INVENTION

Figure 1:
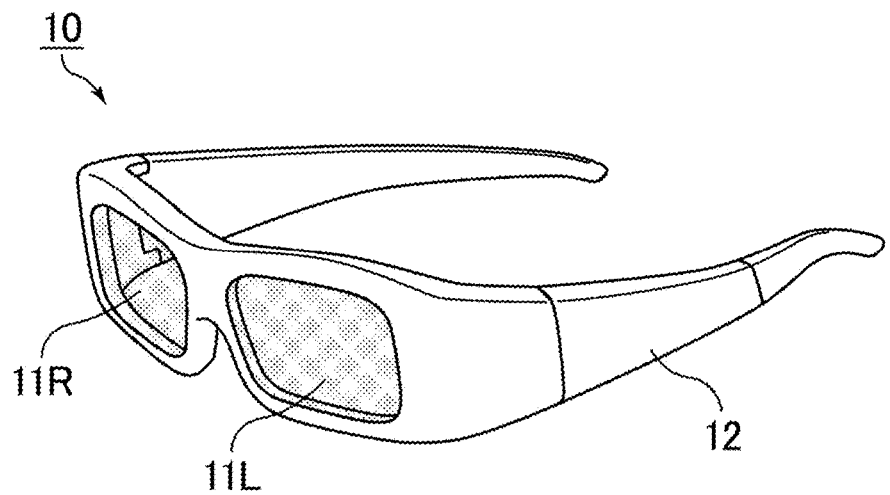
FIG. 1 is a perspective view of an example of 3D glasses according to Embodiment 1.

Hereinafter, embodiments of the present invention are described. The present invention is not limited to the contents of the following embodiments, and the design of the present invention can be modified as appropriate within the range satisfying the configuration of the present invention. Hereinafter, the same reference signs appropriately refer to the same portions or the portions having the same function throughout the drawings, and redundant description of already described portions is omitted as appropriate. The modes in the present invention may appropriately be combined within the gist of the present invention.

DEFINITION OF TERMS

The "viewer side" herein means the side closer to the viewer in a usage mode of the 3D glasses, the optical device, and the three-dimensional image display device. The "back surface side" herein means the side farther from the viewer in the usage mode of the 3D glasses, the optical device, and the three-dimensional image display device.

The "azimuth" herein means the direction in question in a view projected onto a surface of each component and is expressed as an angle (azimuthal angle) formed with the reference azimuth. The angle (azimuthal angle) measures positive in the counterclockwise direction and measures negative in the clockwise direction when each component is viewed from the viewer side (front). The angle (azimuthal angle) is a value measured in a plan view of each component. The reference azimuth ($\varphi=0°$) herein is set to the right in the horizontal direction of the 3D glasses, the optical device, and the three-dimensional image display device in the usage mode of the 3D glasses, the optical device, and the three-dimensional image display device.

The expression that two straight lines (including axes and directions) are "perpendicular" herein means that they are perpendicular in a plan view unless otherwise specified. The expression that two straight lines (including axes and directions) are "parallel" means that they are parallel in a plan view unless otherwise specified. The expression that two axes (directions) are "perpendicular" herein means that they form an angle (absolute value) of 90°±3°, preferably 90°±1°, more preferably 90°±0.5°, particularly preferably 90° (perfectly perpendicular). The expression that two axes (directions) are "parallel" means that they form an angle (absolute value) of 0°±3°, preferably 0°±1°, more preferably 0°±0.5°, particularly preferably 0° (perfectly parallel).

Herein, the phase difference Re in the in-plane direction is defined by Re=(ns−nf)d. The phase difference Rth in the thickness direction is defined by Rth=(nz−(nx+ny)/2)d. The NZ factor (biaxial parameter) is defined by NZ=(ns−nz)/(ns−nf). In the equations, ns represents nx or ny, whichever is greater; nf represents nx or ny, whichever is smaller; nx and ny each represent a principal refractive index in the in-plane direction of a phase difference layer; nz represents a principal refractive index in the out-of-plane direction, i.e., the direction perpendicular to a surface of the phase difference layer; and d represents the thickness of the phase difference layer. The measurement wavelength for a principal refractive index, a phase difference, an NZ factor, and other optical parameters herein is 550 nm, unless otherwise specified.

Herein, the expression that two straight lines (including axes and directions) are "parallel" or arranged "in parallel Nicols" means that they form an angle within the range of 0°±10°, preferably 0°±5°, more preferably 0°±1°. The expression that two straight lines (including axes and directions) are "perpendicular" or arranged "in crossed Nicols" herein means that they form an angle within the range of 90°±10°, preferably 90°±5°, more preferably 90°±1°.

Hereinafter, embodiments of the present invention are described. The present invention is not limited to the contents of the following embodiments, and the design of the present invention can be modified as appropriate within the range satisfying the configuration of the present invention.

Embodiment 1

3D glasses according to Embodiment 1 include a right-eye polarizer and a left-eye polarizer. The right-eye polarizer and the left-eye polarizer each include a polarizing plate and a first λ/4 plate. At least one of the right-eye polarizer or the left-eye polarizer includes a phase difference layer on or behind a back surface side of the polarizing plate. A phase difference introduced by the right-eye polarizer in a thickness direction at a wavelength of 550 nm is different from a phase difference introduced by the left-eye polarizer in the thickness direction at a wavelength of 550 nm.

FIG. 1 is a perspective view of an example of the 3D glasses according to Embodiment 1. As shown in FIG. 1, 3D glasses 10 according to Embodiment 1 include a right-eye polarizer 11R, a left-eye polarizer 11L, and a support 12. The 3D glasses 10 are a polarizer element (polarizing glasses) including the right-eye polarizer 11R and the left-eye polarizer 11L in the positions corresponding to lenses of glasses.

The right-eye polarizer 11R and the left-eye polarizer 11L each include a polarizing plate (first polarizing plate) and a first λ/4 plate. At least one of the right-eye polarizer 11R or the left-eye polarizer 11L includes a phase difference layer closer to the back surface side of the 3D glasses than the first polarizing plate. The presence of a phase difference layer in at least one of the right-eye polarizer 11R or the left-eye polarizer 11L allows a phase difference introduced by the right-eye polarizer 11R in the thickness direction at a wavelength of 550 nm to be different from a phase difference introduced by the left-eye polarizer 11L in the thickness direction at a wavelength of 550 nm. In other words, the present invention does not encompass 3D glasses in which phase difference layers in the right-eye polarizer 11R and the left-eye polarizer 11L provide the same phase difference.

Figure 9:
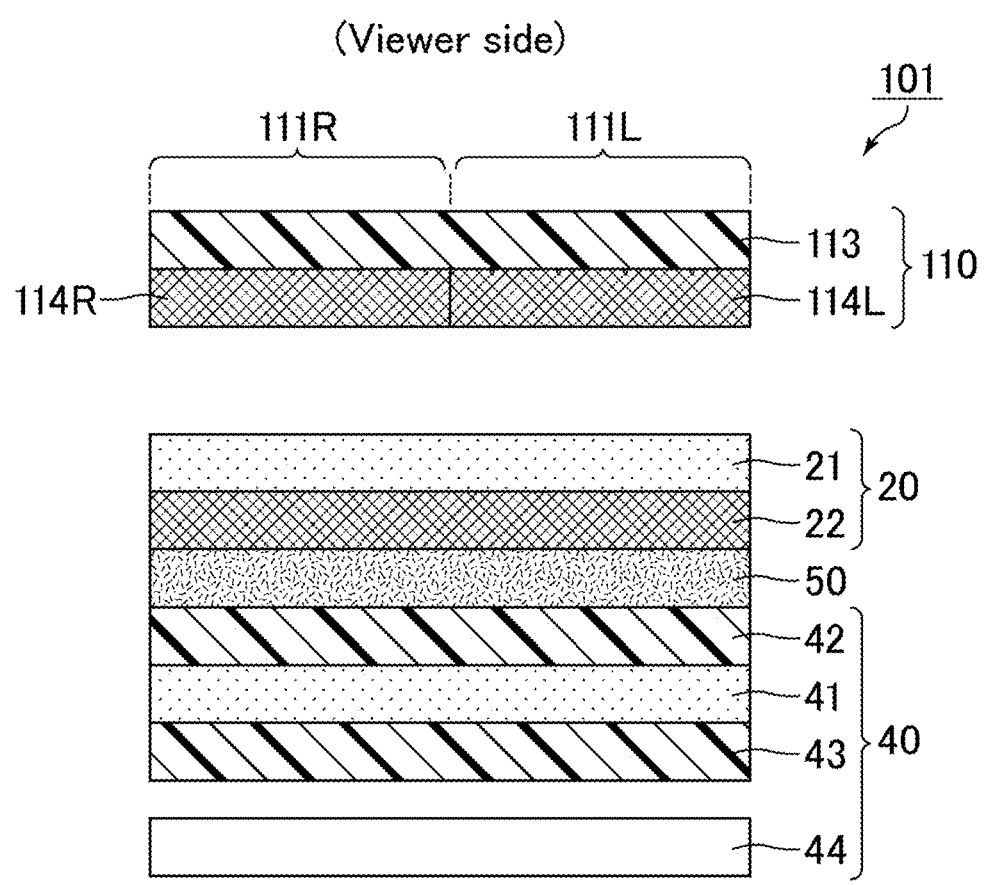
FIG. 9 is a schematic cross-sectional view of an example of a conventional three-dimensional image display device.

A conventional three-dimensional image display device is described with reference to FIG. 9. FIG. 9 is a schematic cross-sectional view of an example of a conventional three-dimensional image display device. As shown in FIG. 9, a conventional three-dimensional image display device 101 includes, sequentially from the back surface side, an image display device 40 and a liquid crystal shutter 20 disposed on the viewer side via an adhesive layer 50, as well as 3D glasses including a polarizing plate 113, a λ/4 plate 114R in a right-eye polarizer 111R, and a λ/4 plate 114L in a left-eye polarizer 111L. FIG. 9 shows a case where the right-eye polarizer 111R and the left-eye polarizer 111L share one polarizing plate 113. The right-eye polarizer 111R and the left-eye polarizer 111L may each individually include the polarizing plate 113.

The liquid crystal shutter 20 is time-divisionally driven and, with the 3D glasses 110 disposed on the viewer side of the liquid crystal shutter 20, alternately blocks light for a right-eye image and light for a left eye image displayed on the image display device 40. The present inventors found that even if light is sufficiently blocked when viewed from the front, light is not sufficiently blocked when viewed from an oblique direction due to lower viewing angle characteristics caused by axial misalignment of the absorption axis of the polarizing plate 113 and the slow axes of the λ/4 plate 114R and the λ/4 plate 114L in the 3D glasses 110, and the slow axis of a shutter liquid crystal panel 21 and the slow axis of a second λ/4 plate 22 in the liquid crystal shutter 20. For example, in a case where light for a left-eye image is insufficiently blocked when a right-eye image is displayed, a phenomenon where the left-eye image is also displayed (crosstalk) occurs. Particularly in a case where the alignment state of the shutter liquid crystal panel 21 when light is blocked and the axial azimuth of the polarizing plate are different between the left and right sides, the viewing angle characteristics for the right eye are different from the viewing angle characteristics for the left eye. Even in a case where a known viewing angle compensation layer is disposed to compensate the viewing angle, reduction of crosstalk is difficult.

In the present invention, a phase difference layer is provided in at least one of the right-eye polarizer 11R or the left-eye polarizer 11L, thereby making the phase difference introduced by the right-eye polarizer 11R and the phase difference introduced by the left-eye polarizer 11L different. Thus, the phase difference introduced by the right-eye polarizer 11R and the phase difference introduced by the left-eye polarizer 11L can be individually adjusted. As a result, disposing a later-described liquid crystal shutter (active retarder) including a liquid crystal panel that is time-divisionally driven on the back surface side of the 3D glasses allows improvement of the light-blocking properties of the right-eye polarizer 11R and the left-eye polarizer 11L when the liquid crystal shutter is turned off, leading to reduction of crosstalk during 3D display.

Figure 2:
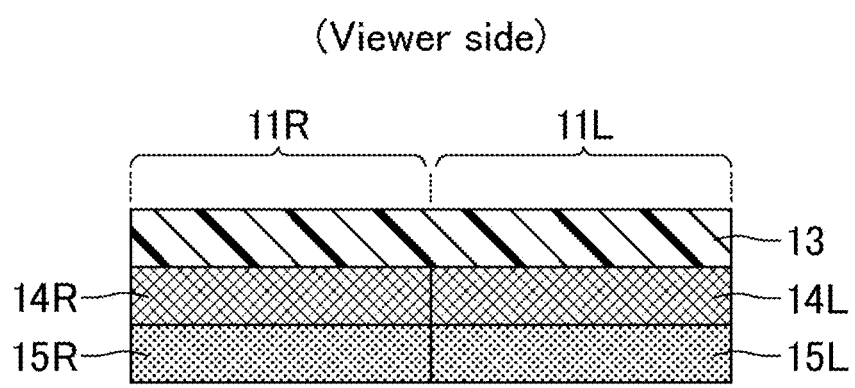
FIG. 2 is a schematic cross-sectional view of a first example of a right-eye polarizer and a left-eye polarizer of the 3D glasses according to Embodiment 1.

FIG. 2 is a schematic cross-sectional view of a first example of a right-eye polarizer and a left-eye polarizer of the 3D glasses according to Embodiment 1. In Embodiment 1, a description is given on a case where the right-eye polarizer 11R and the left-eye polarizer 11L include a phase difference layer 15R and a phase difference layer 15L, respectively. A phase difference introduced by the phase difference layer 15R in the right-eye polarizer 11R in the thickness direction at a wavelength of 550 nm has a value with a sign different from a sign of a value of a phase difference introduced by the phase difference layer 15L in the left-eye polarizer 11L. The phase difference layer 15R and the phase difference layer 15L provide phase differences having values with different signs in the thickness direction, which enables individual adjustment of the phase difference introduced by the right-eye polarizer 11R and the phase difference introduced by the left-eye polarizer 11L, leading to reduction of crosstalk.

The right-eye polarizer 11R and the left-eye polarizer 11L satisfy the following formula (1):

$$|Rth_1 - Rth_2| \geq 120 \text{ nm} \qquad (1)$$

where $Rth_1$ is the phase difference introduced by the right-eye polarizer 11R or the left-eye polarizer 11L in the thickness direction at a wavelength of 550 nm, whichever is greater; $Rth_2$ is the phase difference introduced by the right-eye polarizer 11R or the left-eye polarizer 11L in the thickness direction at a wavelength of 550 nm, whichever is smaller; and $Rth_1 > Rth_2$.

In Embodiment 1, the phase difference introduced by the right-eye polarizer 11R is the sum of phase differences introduced by the polarizing plate 13, the λ/4 plate 14R, and the phase difference layer 15R. The phase difference introduced by the left-eye polarizer 11L is the sum of phase differences introduced by the polarizing plate 13, the λ/4 plate 14L, and the phase difference layer 15L. Crosstalk during 3D display can be also reduced by allowing the absolute value resulting from $Rth_1 - Rth_2$ to be 120 nm or more, where $Rth_1$ is the phase difference introduced by the right-eye polarizer 11R or the left-eye polarizer 11L in the thickness direction, whichever is greater; and $Rth_2$ is the phase difference introduced by the right-eye polarizer 11R or the left-eye polarizer 11L in the thickness direction, whichever is smaller. The $|Rth_1 - Rth_2|$ is preferably, for example, 150 nm or smaller.

<First Polarizing Plate>

The first polarizing plate 13 is preferably a linear polarizing plate. Herein, a "linear polarizing plate" means one having a function of filtering unpolarized light (natural light), partially polarized light, or polarized light into polarized light (linearly polarized light) vibrating only in a specific direction. The first polarizing plate 13 is preferably an absorptive polarizing plate.

An "absorptive polarizing plate" means one having a function of absorbing light vibrating in a specific direction while transmitting polarized light (linearly polarized light) vibrating in a direction vertical to the specific direction. An absorptive polarizing plate has a transmission axis and an absorption axis perpendicular to the transmission axis.

The absorptive polarizing plate may be, for example, a polarizing plate (absorptive polarizing plate) obtained by dyeing a polyvinyl alcohol (PVA) film with an anisotropic material such as an iodine complex (or dye) to adsorb the anisotropic material on the PVA film and stretching the material for alignment. Typically, in order to achieve a mechanical strength and moist heat resistance, each surface of the PVA film is laminated with a protective film such as a cellulose triacetate film for practical use.

<First λ/4 Plate>

A λ/4 plate herein refers to a phase difference plate that provides a phase difference in the in-plane direction of ¼ wavelength (strictly 137.5 nm) for at least light with a wavelength of 550 nm, and provides a phase difference in the in-plane direction of 120 nm or more and 150 nm or less.

The first λ/4 plate and the later-described phase difference layer(s) 15 may be formed from any material. For example, a stretched polymer film, or a film made of a liquid crystalline material whose alignment is fixed can be used.

The first λ/4 plate and the later-described phase difference layer(s) 15 may be formed by any method. When the first λ/4 plate and the later-described phase difference layer(s) 15 are each formed from a polymer film, for example, a method such as solvent casting or melt extrusion can be used. Also, co-extrusion may be used to form a plurality of phase difference layers simultaneously. The polymer film may or may not be stretched as long as the desired phase difference is introduced. The stretching method may be any method such as tensile stretching between rolls, compression stretching between rolls, tenter transverse uniaxial stretching, oblique stretching, vertical and transverse biaxial stretching, or special stretching where a film is stretched under the shrinkage stress of a heat shrinkable film. When the first λ/4 plate and the later-described phase difference layer(s) 15 are each formed from a liquid crystalline material, for example, a method can be used such as a method of applying a liquid crystalline material to a base film having undergone an alignment treatment and fixing the alignment of the material. The method may be one including no special alignment treatment on a base film or one including removing the liquid crystalline material from the base material after the alignment fixation and transferring the material to another film, as long as the desired phase difference is introduced. A method may also be used which includes no fixation of the alignment of a liquid crystalline material. When the first λ/4 plate and the later-described phase difference layer(s) 15 are each formed from a non-liquid crystalline material, the same formation method as when the first λ/4 plate and the phase difference layer(s) 15 are each formed from a liquid crystalline material may be used.

<Phase Difference Layer>

The phase difference layer(s) 15 provide(s) a retardation in absolute value of not less than 10 nm, preferably not less than 20 nm in the thickness direction at a wavelength of 550 nm. The phase difference can be measured using, for example, a dual rotating retarder polarimeter (available from Axometrics, Inc., product name: Axo-scan).

The phase difference layer 15R in the right-eye polarizer 11R and the phase difference layer 15L in the left-eye polarizer 11L provide phase differences having values with different signs in the thickness direction at a wavelength of 550 nm. The phase difference layers 15R and 15L are preferably C plates (positive C plate or negative C plate). When the phase difference layers 15R and 15L are C plates, the phase differences introduced by the phase difference layers 15R and 15L refer to the phase differences in the thickness direction.

One of the phase difference layer 15R in the right-eye polarizer 11R and the phase difference layer 15L in the left-eye polarizer 11L is a positive C plate that provides a phase difference in absolute value of 80 nm to 140 nm in the thickness direction at a wavelength of 550 nm, and the other is preferably a negative C plate that provides a phase difference in absolute value of 20 nm to 120 nm in the thickness direction at a wavelength of 550 nm. Such an embodiment can more effectively reduce crosstalk.

A positive C plate is a phase difference layer in which three principal refractive indices nx, ny, and nz satisfy the relationship nx=ny<nz. A negative C plate is a phase difference layer in which three principal refractive indices nx, ny, and nz satisfy the relationship nx=ny>nz. In any C plate, nx=ny may not be strictly satisfied, and the value of a phase difference in the in-plane direction, (nx−ny)×d, is preferably 5 nm or less.

The phase difference layer 15R and the phase difference layer 15L preferably satisfy the following formula (2):

$$|Rth_3 - Rth_4| \geq 120 \text{ nm} \tag{2}$$

where $Rth_3$ is the phase difference introduced by the phase difference layer 15R or the phase difference layer 15L in the thickness direction at a wavelength of 550 nm, whichever is greater; $Rth_4$ is the phase difference introduced by the phase difference layer 15R or the phase difference layer 15L in the thickness direction at a wavelength of 550 nm, whichever is smaller; and $Rth_3 > Rth_4$. The $|Rth_3 - Rth_4|$ is preferably 150 nm or less.

As in the first example shown in FIG. 2, the right-eye polarizer 11R and the left-eye polarizer 11L may share one first polarizing plate 13 and have a first λ/4 plate 14R and a first λ/4 plate 14L, respectively. In the case of the first example, the slow axis of the first λ/4 plate 14R in the right-eye polarizer 11R and the slow axis of the first λ/4 plate 14L in the left-eye polarizer 11L are preferably perpendicular to each other. Also, the angle formed between the absorption axis of the first polarizing plate 13 and the slow axis of the first λ/4 plate 14R, and the angle formed between the absorption axis of the first polarizing plate 13 and the first λ/4 plate 14L are preferably 45°±3°, more preferably 45°±1°, still more preferably 45°.

Figure 3:
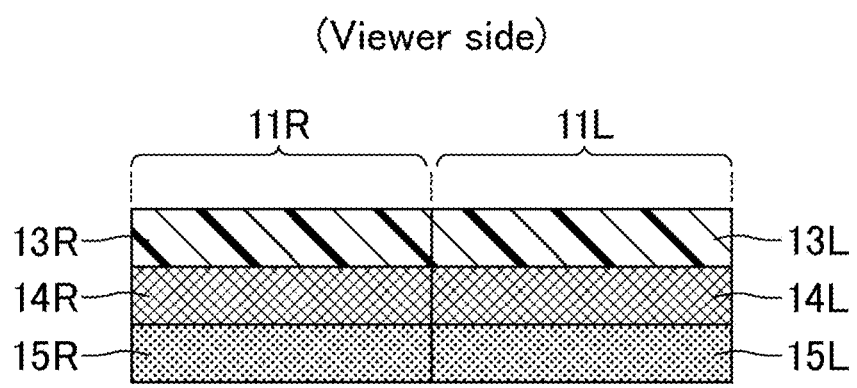
FIG. 3 is a schematic cross-sectional view of a second example of the right-eye polarizer and the left-eye polarizer of the 3D glasses according to Embodiment 1.

FIG. 3 is a schematic cross-sectional view of a second example of the right-eye polarizer and the left-eye polarizer of the 3D glasses according to Embodiment 1. As in the second example shown in FIG. 3, the right-eye polarizer 11R and the left-eye polarizer 11L may include a combination of the first polarizing plate 13R and the first λ/4 plate 14R and a combination of the first polarizing plate 13L and the first λ/4 plate 14L, respectively. The absorption axes of the first polarizing plate 13R and the first polarizing plate 13L may be arranged in the same manner as the absorption axis of the first polarizing plate 13 described in the first example. The first λ/4 plate 14R and the first λ/4 plate 14L may be arranged in the same manner as in the first example.

Figure 4:
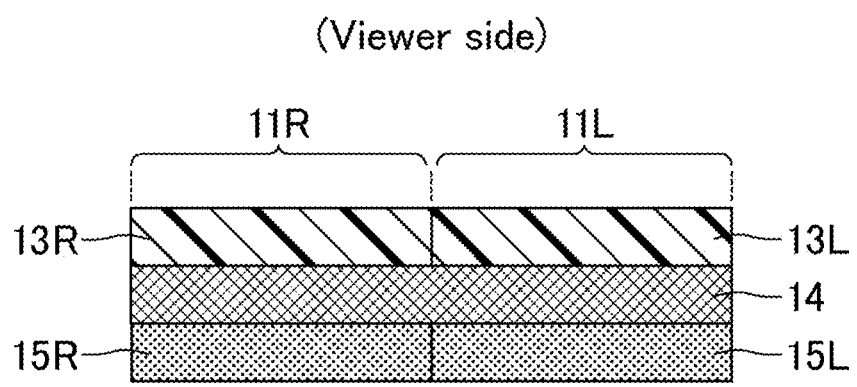
FIG. 4 is a schematic cross-sectional view of a third example of the right-eye polarizer and the left-eye polarizer of the 3D glasses according to Embodiment 1.

FIG. 4 is a schematic cross-sectional view of a third example of the right-eye polarizer and the left-eye polarizer of the 3D glasses according to Embodiment 1. As in the third example shown in FIG. 4, the right-eye polarizer 11R and the left-eye polarizer 11L may include the first polarizing plate 13R and the first polarizing plate 13L, respectively, and share one first λ/4 plate 14. In the case of the third example, the absorption axis of the first polarizing plate 13R in the right-eye polarizer 11R and the absorption axis of the first polarizing plate 13L in the left-eye polarizer 11L are preferably perpendicular to each other. The angle formed between the slow axis of the first λ/4 plate 14 and the absorption axis of the first polarizing plate 13R, and the angle formed between the slow axis of the first λ/4 plate 14 and the absorption axis of the first polarizing plate 13L are preferably 45°±3°, more preferably within the range of 45°±1°, still more preferably 45°.

The first polarizing plate 13R in the right-eye polarizer 11R and the first polarizing plate 13L in the left-eye polarizer 11L are herein simply referred to as "first polarizing plates 13" when no distinction is made therebetween. The first λ/4 plate 14R in the right-eye polarizer 11R and the first λ/4 plate 14L in the left-eye polarizer 11L are simply referred to as "λ/4 plates 14" when no distinction is made therebetween.

<Support>

The support 12 may be any part that can adjust the positions of the right-eye polarizer 11R and the left-eye polarizer 11L to the viewer's right eye and left eye, respectively. For example, it may include a frame (rim) for fixing the right-eye polarizer 11R and the left-eye polarizer 11L and a member (temple) worn by the viewer's ear, like an eyeglass frame.

Embodiment 2

Figure 5:
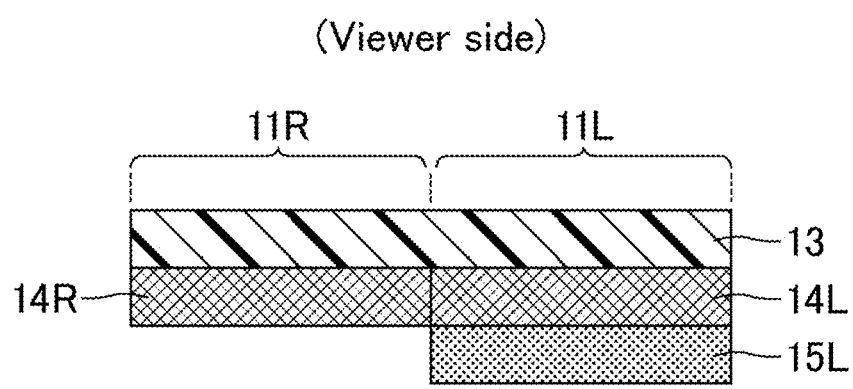
FIG. 5 is a schematic cross-sectional view of an example of a right-eye polarizer and a left-eye polarizer of 3D glasses according to Embodiment 2.

In 3D glasses according to Embodiment 2, one of the right-eye polarizer 11R and the left-eye polarizer 11L alone includes a phase difference layer. FIG. 5 is a schematic cross-sectional view of an example of a right-eye polarizer and a left-eye polarizer of 3D glasses according to Embodiment 2. FIG. 5 shows a case where a phase difference layer (phase difference layer 15L) is disposed only in the left-eye polarizer 11L. The phase difference layer may also be disposed only in the right-eye polarizer 11R.

The right-eye polarizer 11R and the left-eye polarizer 11L preferably satisfy the following formula (1):

$$|Rth_1 - Rth_2| \geq 120 \text{ nm} \tag{1}$$

where $Rth_1$ is the phase difference introduced by the right-eye polarizer 11R or the left-eye polarizer 11L in the thickness direction at a wavelength of 500 nm, whichever is greater; $Rth_2$ is the phase difference introduced by the right-eye polarizer 11R or the left-eye polarizer 11L in the thickness direction at a wavelength of 500 nm, whichever is smaller; and $Rth_1 > Rth_2$.

Even if one of the right-eye polarizer 11R and the left-eye polarizer 11L alone includes a phase difference layer, crosstalk during 3D display can be reduced by allowing the absolute value resulting from $Rth_1 - Rth_2$ to be 120 nm or more, where $Rth_1$ is the phase difference introduced by the right-eye polarizer 11R or the left-eye polarizer 11L in the thickness direction, whichever is greater; and $Rth_2$ is the phase difference introduced by the right-eye polarizer 11R or the left-eye polarizer 11L in the thickness direction, whichever is smaller. In the case of FIG. 5, the phase difference introduced by the right-eye polarizer 11R is the sum of the phase differences introduced by the polarizing plate 113 and the λ/4 plate 114R. The phase difference introduced by the left-eye polarizer 11L is the sum of the phase differences introduced by the polarizing plate 113, the λ/4 plate 114L, and the phase difference layer 15L. The $|Rth_1 - Rth_2|$ is preferably, for example, 150 nm or less.

When the phase difference layer is disposed only in one of the right-eye polarizer 11R and the left-eye polarizer 11L, the phase difference layer may be a positive C plate that provides a phase difference of 80 to 140 nm in absolute value in the thickness direction at a wavelength of 550 nm or a negative C plate that provides a phase difference of 20 to 120 nm in absolute value in the thickness direction at a wavelength of 550 nm.

In Embodiment 2, any of the first to fourth examples described in Embodiment 1 can be applied to the first polarizing plate 13 and the first λ/4 plate 14. The right-eye polarizer 11R and the left-eye polarizer 11L may share one first polarizing plate 13 and one first λ/4 plate 14, or each individually include the first polarizing plate 13 and/or the first λ/4 plate 14. The axial arrangement of the phase difference layer may be set as in Embodiment 1.

Embodiment 3

An optical device according to Embodiment 3 includes the 3D glasses according to Embodiment 1 or 2, and a liquid crystal shutter on or behind the back surface side of the 3D glasses. The liquid crystal shutter includes a liquid crystal panel that is time-divisionally driven and a second λ/4 plate on a back surface side of the liquid crystal panel.

<Liquid Crystal Shutter Part>

Figure 6:
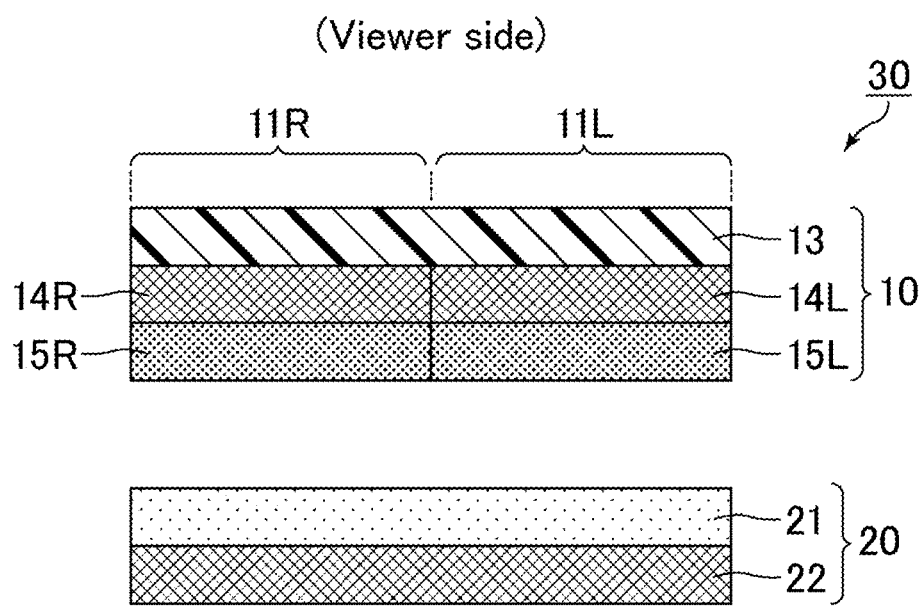
FIG. 6 is a schematic cross-sectional view of an example of an optical device according to Embodiment 3.

FIG. 6 is a schematic cross-sectional view of an example of an optical device according to Embodiment 3. Description is omitted for the features of the 3D glasses that have been described. As shown in FIG. 6, the liquid crystal shutter 20 includes a liquid crystal panel 21 and a second λ/4 plate 22 on the back surface side of the liquid crystal panel 21. Hereinafter, the liquid crystal shutter 20 is also referred to as an active retarder and the liquid crystal panel 21 in the liquid crystal shutter 20 is also referred to as a shutter liquid crystal panel 21.

The liquid crystal shutter 20 is turned on and off to change the phase of light passing through the liquid crystal shutter 20. In a case where an image display device 40 described later is disposed behind the back surface of the liquid crystal shutter 20 and the image display device 40 includes a linear polarizing plate on its front surface side, linearly polarized light is incident on the liquid crystal shutter 20. The linearly polarized light is emitted to the viewer side as right-handed or left-handed circularly polarized light depending on whether the liquid crystal shutter 20 is turned on or off, thereby providing 3D display when right-eye and left-eye images alternately displayed on the image display device 40 are viewed through the liquid crystal shutter 20 and the 3D glasses.

The right-handed circularly polarized light herein refers to light having the electric field vector of the light wave rotating clockwise as the light wave travels, and left-handed circularly polarized light refers to light having the electric field vector of the light wave rotating counterclockwise as the light wave travels, when the light is viewed facing the traveling direction of the light. Circularly polarized light includes not only perfect circularly polarized light (ellipticity (minor axis/major axis)=1.00) but also elliptical polarized light with an ellipticity of 0.90 or more and less than 1.00.

<Shutter Liquid Crystal Panel>

The shutter liquid crystal panel 21 is a liquid crystal panel that is time-divisionally driven. Time-divisional driving refers to a driving method in which the polarization state of light created by the shutter liquid crystal panel 21 is alternately switched at regular time intervals. For example, transmission and blocking of light may be switched every 1/240 to 1/120 seconds.

The configuration of the shutter liquid crystal panel 21 includes, for example, a first substrate, a second substrate disposed to face the first substrate, and a liquid crystal layer (first liquid crystal layer) sandwiched between the first substrate and the second substrate. The first substrate may sequentially include a first supporting substrate, a first electrode, and a first alignment film towards the first liquid crystal layer side. The second substrate may sequentially include a second supporting substrate, a second electrode, and a second alignment film towards the first liquid crystal layer side.

The shutter liquid crystal panel 21 is preferably in an electrically controlled birefringence (ECB) mode that utilizes birefringence of a liquid crystal layer. Voltage application between the first electrode and the second electrode changes the alignment of liquid crystal molecules in the first liquid crystal layer, leading to a change in retardation of the liquid crystal layer. For example, the shutter liquid crystal panel 21 may be in a vertical alignment mode, in which the initial alignment of the liquid crystal molecules with no voltage applied is parallel to the surfaces of the first substrate and the second substrate and the initial alignment of the liquid crystal molecules with voltage applied is vertical to the surfaces of the first substrate and the second substrate (alignment along the thickness direction of the liquid crystal layer). The state with no voltage applied herein means a state where no voltage is applied to the liquid crystal layer, and includes a state where voltage lower than the threshold of the liquid crystal molecules is applied. The state with voltage applied herein means a state where voltage equal to or higher than the threshold of the liquid crystal molecules is applied.

The shutter liquid crystal panel 21 may be a liquid crystal panel that is driven by a passive driving method or a liquid crystal panel that is driven by an active-matrix driving method described later. The retardation of the entire shutter liquid crystal panel 21 is preferably uniformly controlled by turning on/off the voltage applied to the first liquid crystal layer. In the passive driving method, for example, the first electrode and the second electrode may each be arranged in a grid pattern. Unlike active-matrix driving described later, the passive driving method does not require a switching element such as a TFT for each pixel, which increases transmittance and reduces production costs.

Examples of the first supporting substrate and the second supporting substrate include insulating substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The first electrode and the second electrode may be thin-film solid electrodes formed on the entire surfaces of the first substrate and the second substrate, respectively. The first electrode and the second electrode are preferably transparent electrodes. The first electrode and the second electrode can each be formed by forming a single- or multi-layered film of a transparent conductive material such as indium tin oxide (ITO), indium zinc oxide (IZO), zinc oxide (ZnO), or tin oxide (SnO) or an alloy of any of these materials by a method such as sputtering, followed by patterning of the film by a method such as photolithography.

The anisotropy of dielectric constant ($\Delta\varepsilon$) of the liquid crystal molecules is defined by the following formula (L). The liquid crystal molecules preferably have a positive anisotropy of dielectric constant. The average direction (director) of the long axes of liquid crystal molecules corresponds to the direction of the slow axis of the liquid crystal layer. The average direction of the long axes of liquid crystal molecules with no voltage applied is also referred to as the initial alignment direction of the liquid crystal molecules. The liquid crystal molecules with no voltage applied may be homogeneously aligned.

$\Delta\varepsilon$=(dielectric constant in long axis direction of liquid crystal molecules)−(dielectric constant in short axis direction of liquid crystal molecules)   (L)

The first liquid crystal layer preferably acts as a λ/2 plate in the state with no voltage applied, and preferably acts as a positive C plate in the state with voltage applied.

The first alignment film and the second alignment film each have a function of controlling the alignment of liquid crystal molecules in a liquid crystal layer. When the voltage applied to the liquid crystal layer is lower than the threshold voltage (including the case of no voltage application), the alignment of the liquid crystal molecules in the liquid crystal layer is mainly controlled by the alignment films. The alignment film used may be any alignment film known in the field of liquid crystal panels.

<Second λ/4 Plate>

As shown in FIG. 6, the second λ/4 plate 22 is disposed on the back surface side of the shutter liquid crystal panel 21. The second λ/4 plate 22 used may be one made of the same material or providing the same phase difference as the first λ/4 plate 14.

The alignment azimuth (direction of the director) of the liquid crystal molecules in the first liquid crystal layer in the state with no voltage applied is also called the slow axis of the first liquid crystal layer, and the slow axis of the second λ/4 plate 22 is preferably arranged so as to be perpendicular to the slow axis of the first liquid crystal layer.

Figure 7:
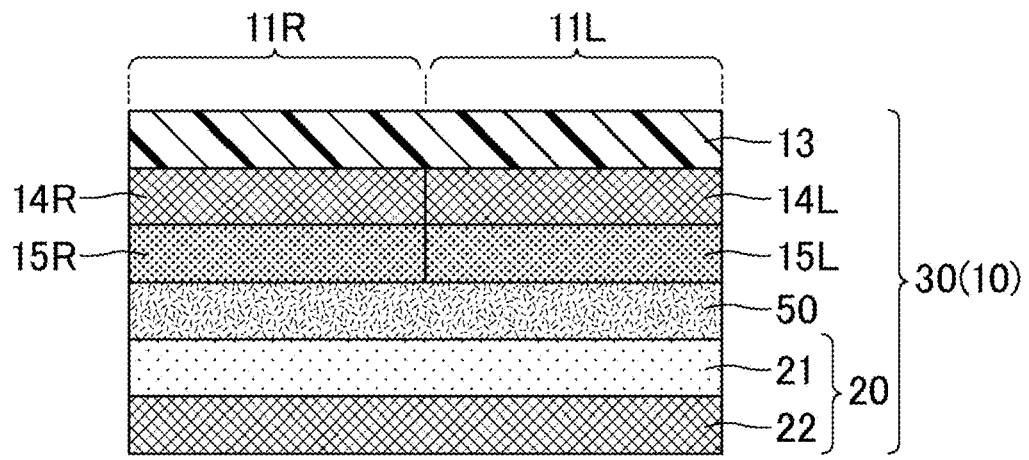
FIG. 7 is a schematic cross-sectional view of another example of the optical device according to Embodiment 3.

FIG. 7 is a schematic cross-sectional view of another example of the optical device according to Embodiment 3. As shown in FIG. 7, the liquid crystal shutter 20 may be bonded to the surface on the side opposite to the viewer side of the 3D glasses via an adhesive layer 50 to be integrated with the 3D glasses. This configuration can reduce crosstalk that occurs when an image to be perceived through the left-eye polarizer 11L is also viewed with the right eye or when an image to be perceived through the right-eye polarizer 11R is also viewed with the left eye. In the case of FIG. 7, the 3D glasses 10 can be considered as the optical device 30. The 3D glasses 10 may include a battery and a drive circuit for driving the shutter liquid crystal panel 21.

The adhesive layer can be formed from any material such as a resin material (e.g., acrylic resin, silicon-based resin, urethane-based resin) or a rubber material.

The liquid crystal shutter 20 may be integrated with an image display device as shown in in FIG. 8 described later, not being bonded to the 3D glasses. In a case where the 3D glasses and the liquid crystal shutter 20 are disposed apart from each other, the absorption axis of the first polarizing plate 13 in the 3D glasses 10, the slow axes of the first λ/4 plate 14R and the first λ/4 plate 14L in the 3D glasses 10, and the slow axis of the shutter liquid crystal panel 21 in the liquid crystal shutter 20 may be shifted when the viewer wearing the 3D glasses tilts his/her head. Even in such a case, the different phase difference layers disposed for the left and right eyes increase the effect of blocking light from an oblique direction in a state where light is blocked, thereby reducing crosstalk.

<Display Method>

The description below is given on blocking and transmission of light in the optical device in the case where the 3D glasses 10 have the configuration of the first example shown in FIG. 2. A case is described where the slow axis of the first λ/4 plate 14R is arranged at −45° in the right-eye polarizer 11R and the slow axis of the first λ/4 plate 14L is arranged at 45° in the left-eye polarizer 11L in the 3D glasses 10. In the optical device 30 described here, the shutter liquid crystal panel 21 is in the ECB mode and the slow axis of the second λ/4 plate 22 on the back surface of the shutter liquid crystal panel 21 is arranged at −45°. The image display device 40 described later is disposed on the back surface side of the optical device 30, and the absorption axis of the second polarizing plate 42 on the optical device 30 side of the image display device 40 is arranged so as to be perpendicular to the absorption axis of the first polarizing plate 13 in the 3D glasses 10.

(Case where Voltage is Off)

A case where the liquid crystal shutter 20 is turned off is described. The case where the liquid crystal shutter 20 is turned off means a state with no voltage applied where voltage is not applied to the liquid crystal layer (hereinafter also referred to as the first liquid crystal layer) of the shutter liquid crystal panel 21. When the shutter liquid crystal panel 21 is in the ECB mode, the first liquid crystal layer acts as a λ/2 plate in the state with no voltage applied. When the first liquid crystal layer acts as a λ/2 plate with a slow axis at 45°, the liquid crystal shutter 20 (formed of two layers including the first liquid crystal layer and the second λ/4 plate with a slow axis at −45°) can be considered as a λ/4 plate with a slow axis at 45°.

For the right-eye polarizer 11R, the slow axis of the liquid crystal shutter 20 (a stack of the first liquid crystal layer and the second λ/4 plate 22) and the slow axis of the first λ/4 plate 14R are perpendicular to each other to cancel phase differences. Therefore, the perpendicular relationship between the absorption axis of the second polarizing plate 42 and the absorption axis of the first polarizing plate 13 is maintained to block light in the right-eye polarizer 11R.

For the left-eye polarizer 11L, the slow axis of the liquid crystal shutter 20 (a stack of the first liquid crystal layer and the second λ/4 plate 22) and the slow axis of the first λ/4 plate 14L are parallel to each other, and therefore the liquid crystal shutter 20 (a stack of the first liquid crystal layer and the second λ/4 plate 22) and the first λ/4 plate 14L used in a stack serve as a λ/2 plate with the slow axis angle of 45°. Therefore, in the left-eye polarizer 11L, the linearly polarized light emitted from the image display device 40 and transmitted through the second polarizing plate 42 is rotated +90° due to the action of the λ/2 plate and passes through the first polarizing plate 13.

(Case where Voltage is on)

A case where the liquid crystal shutter 20 is turned on is described. The case where the liquid crystal shutter 20 is turned on means a state with voltage applied where voltage is applied to the liquid crystal layer (first liquid crystal layer) of the shutter liquid crystal panel 21. When the shutter liquid crystal panel 21 is in the ECB mode, liquid crystal molecules are aligned vertical to the in-plane direction of the shutter liquid crystal panel 21 in the state with voltage applied, which allows the first liquid crystal layer to act as a positive C plate. The positive C plate can be regarded to be nonexistent when viewed from the front because the optic axis coincides with the normal direction and the in-plane slow axis is not defined. Therefore, the liquid crystal shutter 20 (a stack of the first liquid crystal layer and the second λ/4 plate 22) can be regarded as a λ/4 plate with a slow axis at −45°.

For the right-eye polarizer 11R, the slow axis of the stack of the first liquid crystal layer and the second λ/4 plate 22 and the slow axis of the first λ/4 plate 14R are parallel to each other, and therefore the liquid crystal shutter 20 (a stack of the first liquid crystal layer and the second λ/4 plate 22) and the first λ/4 plate 14R used in a stack serve as a λ/2 plate with the slow axis angle of −45°. Therefore, in the right-eye polarizer 11R, the linearly polarized light emitted from the image display device 40 and transmitted through the second polarizing plate 42 has its polarization direction rotated −90° due to the action of the λ/2 plate and passes through the first polarizing plate 13.

For the left-eye polarizer 11L, the slow axis of the liquid crystal shutter 20 (a stack of the first liquid crystal layer and the second λ/4 plate 22) and the slow axis of the first λ/4 plate 14L are perpendicular to each other to cancel phase differences. Therefore, the perpendicular relationship between the absorption axis of the second polarizing plate 42 and the absorption axis of the first polarizing plate 13 is maintained to block light in the left-eye polarizer 11L.

3D display (three-dimensional stereoscopic display) can be performed by turning on and off the voltage applied to the liquid crystal shutter 20 in this manner to switch between the image entering the viewer's eyes through the right-eye polarizer 11R and the image entering the viewer's eye from the left-eye polarizer 11L.

As described above, three-dimensional stereoscopic display can be performed by turning on and off the voltage applied to the liquid crystal shutter 20 not only when the 3D glasses have the configuration of the third example shown in FIG. 3 but also when the 3D glasses have the configuration of the fourth example shown in FIG. 4.

Embodiment 4

A three-dimensional image display device according to Embodiment 4 includes the optical device according to Embodiment 3 and an image display device on the back surface side of the optical device. The image display device includes a pair of polarizing plates and an image-displaying panel sandwiched between the pair of polarizing plates.

FIG. 9 is a schematic cross-sectional view of an example of a three-dimensional image display device according to Embodiment 4. In FIG. 9, the liquid crystal shutter 20 is disposed apart from the 3D glasses on the side opposite to the viewer side of the 3D glasses 10, and the image display device 40 is bonded to the back surface side of the liquid crystal shutter 20 by the adhesive layer 50. As shown in FIG. 7 described above, when the 3D glasses are integrated with the liquid crystal shutter 20, the image display device 40 may be disposed apart from the back surface of the liquid crystal shutter 20. The image display device 40 may include a backlight unit 44 on the back surface side.

The image display device 40 preferably alternately displays a right-eye image and a left-eye image. The right-eye and left-eye images are preferably displayed in conjunction with switching between a state where light is transmitted and a state where light is blocked in the shutter liquid crystal panel 21 in the liquid crystal shutter 20 described above. Stereoscopic display is performed by displaying the right-eye image when the right-eye polarizer 11R in the 3D glasses transmits light, and displaying the left-eye image when the left-eye polarizer 11L transmits light.

<Image-Displaying Panel>

The image-displaying panel 41 is preferably a liquid crystal panel. The alignment mode of the image-displaying panel 41 is not limited, and may be a transverse electric field mode such as the fringe field switching (FFS) mode and the in plane switching (IPS) mode in which liquid crystal molecules in the liquid crystal layer align parallel to substrate surfaces in the state with no voltage applied, or a vertical electric field mode such as the vertical alignment (VA) mode in which liquid crystal molecules in the liquid crystal layer align vertical to substrate surfaces in the state with no voltage applied.

The image-displaying panel 41 includes, for example, a third substrate, a fourth substrate disposed to face the third substrate, and a liquid crystal layer (second liquid crystal layer) sandwiched between the third substrate and the fourth substrate. The third substrate may be a TFT substrate and the fourth substrate may be a color filter substrate.

When the third substrate is a TFT substrate, the third substrate may sequentially include a third supporting substrate, a third electrode, and a third alignment film towards the second liquid crystal layer side. The TFT substrate includes, on the third supporting substrate, for example, gate lines and source lines parallel to the gate lines arranged in a grid pattern, and thin film transistors (TFT) as switching elements arranged at or near the intersections. Each region surrounded by the gate lines and the source lines defines a pixel. Each pixel includes a pixel electrode connected to the corresponding TFT via the drain electrode. The image-displaying panel 41 may be driven by any method such as the active matrix driving method commonly employed.

When the fourth substrate is a color filter substrate, the fourth substrate may sequentially include a fourth supporting substrate, and a fourth alignment film towards the second liquid crystal layer side. The color filter substrate includes, for example, a fourth supporting substrate, a black matrix, and color filters separated by the black matrix. The color filters include, for example, red, green, and blue color filters. As the color filters and the black matrix, those commonly used in the field of liquid crystal display devices can be used.

When the image-displaying panel 41 is a transverse electric field mode liquid crystal panel, the TFT substrate includes a fourth electrode (counter electrode) provided on the pixel electrodes via an insulating layer, and voltage is applied between the pixel electrodes and the counter electrode to generate a transverse electric field (including a fringe electric field) in the liquid crystal layer, thereby performing display. When the image-displaying panel 41 is a vertical electric field mode liquid crystal panel, the color filter substrate includes a fourth electrode (counter electrode), and voltage is applied between the pixel electrodes and the counter electrode to generate a vertical electric field in the thickness direction in the liquid crystal layer.

The third and fourth supporting substrates used may be the same as the first and second supporting substrates. The third and fourth alignment films used may be the same as the first and second alignment films. The third and fourth electrodes may be formed using the same materials as those of the first and second electrodes.

The second liquid crystal layer may be one commonly used in the field of liquid crystal display devices. The second liquid crystal layer contains liquid crystal molecules. The anisotropy of dielectric constant ($\Delta\varepsilon$) of the liquid crystal molecules defined by the formula (L) may be positive or negative.

<Second and Third Polarizing Plates>

The second polarizing plate 42 and the third polarizing plate 43 are preferably linear polarizing plates. The second polarizing plate 42 and the third polarizing plate 43 may be absorptive polarizing plates, reflective polarizing plates, or stacks of an absorptive polarizing plate and a reflective polarizing plate. The second polarizing plate 42 and the third polarizing plate 43 used each may be the same as the first polarizing plate 13. The second polarizing plate 42 and the third polarizing plate 43 are arranged in crossed Nicols with their absorption axes perpendicular to each other.

A reflective polarizing plate means one having a function of reflecting light vibrating in a specific direction while transmitting polarized light (linearly polarized light) vibrating in a direction vertical to the specific direction. A reflective polarizing plate has a transmission axis and a reflection axis perpendicular to the transmission axis. Herein, when a reflective polarizing plate is used as the polarizing plate, the term "absorption axis" should be read as the "reflection axis".

Examples of the reflective polarizing plate include reflective polarizing plates obtained by uniaxially stretching a co-extruded film made of two types of resins (e.g., APCF available from Nitto Denko Corporation, DBEF available from 3M Company), and reflective polarizing plates including periodic arrays of metal thin lines (wire grid polarizing plates).

The absorption axis of the second polarizing plate 42 on the optical device 30 side of the image display device 40 is preferably arranged so as to be perpendicular to the absorption axis of the first polarizing plate 13 in the 3D glasses 10.

<Backlight Unit>

The backlight unit 44 may be any backlight unit commonly used in the field of liquid crystal display devices, and may be a direct-lit backlight including light sources coinciding with the display region of the image-displaying panel 41, or an edge-lit backlight including a light guide plate and light sources along an end of the light guide plate.

EXAMPLES

Hereinafter, the present invention is described in more detail with reference to examples and comparative examples. The present invention is not limited to these examples.

Examples 1 to 3

Figure 8:
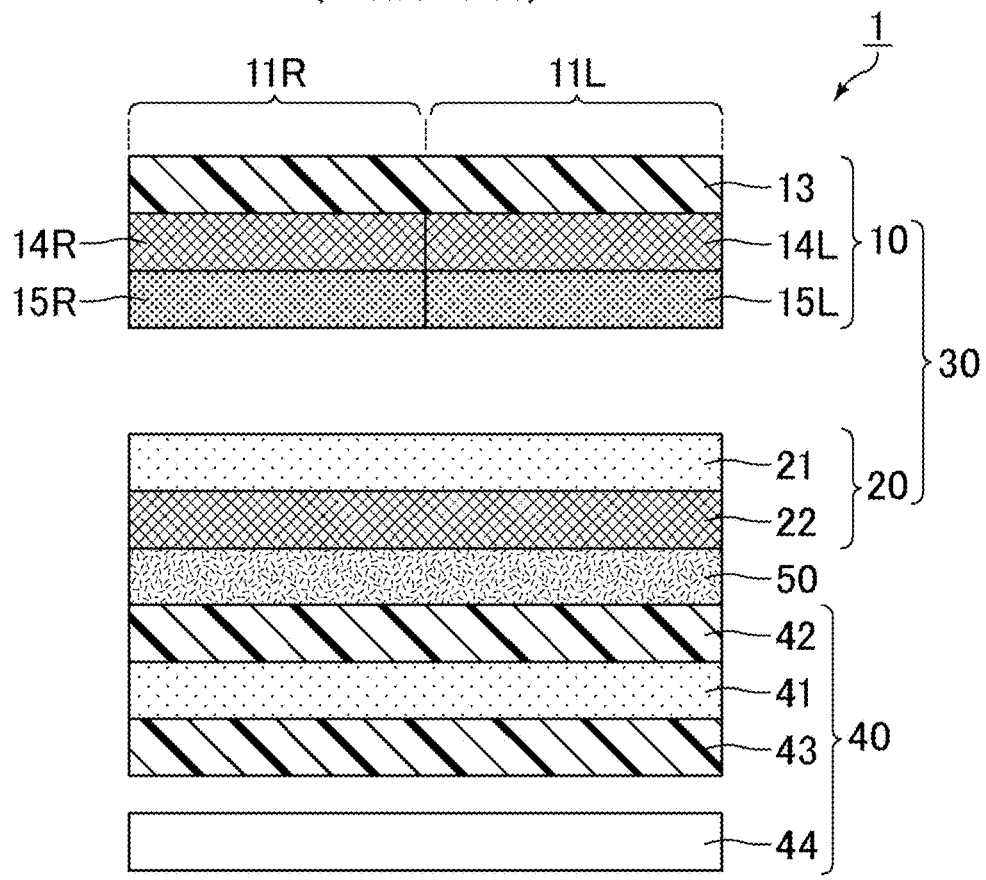
FIG. 8 is a schematic cross-sectional view of an example of a three-dimensional image display device according to Embodiment 4.

Three-dimensional image display devices of Examples 1 to 3 each include 3D glasses, a liquid crystal shutter, and an image display device as in FIG. 8 and the 3D glasses have a configuration shown as in the first example of Embodiment 1 in FIG. 1. In the 3D glasses of Examples 1 to 3, the right-eye polarizer 11R and the left-eye polarizer 11L share one first polarizing plate 13. The right-eye polarizer 11R includes the first polarizing plate 13, the first λ/4 plate 14R, and the phase difference layer 15R sequentially in this order from the viewer side. The left-eye polarizer 11L includes the first polarizing plate 13, the first λ/4 plate 14L, and the phase difference layer 15L sequentially in this order from the viewer side.

The liquid crystal shutter includes an ECB-mode liquid crystal panel as the shutter liquid crystal panel, and liquid crystal molecules in the liquid crystal layer are positive liquid crystals having a positive anisotropy of dielectric constant (Δε=7.0). Examples of the ECB mode liquid crystal panel include a panel in which a liquid crystal layer is sandwiched between a pair of substrates and electrode(s) and an alignment film are formed on the side facing the liquid crystal layer of each substrate.

The axial azimuths of the first polarizing plate 13, the second polarizing plate 42, and the third polarizing plate were set at 90°, 0°, and 90°, respectively. The slow axis of the first λ/4 plate 14R in the right-eye polarizer 11R was set at −45°, and the slow axis of the first λ/4 plate 14L in the left-eye polarizer 11L was set at 45°.

The reference azimuth (0°) was set to the right in the horizontal direction of the 3D glasses when viewed from the viewer side.

Tables 1 to 3 show the phase differences of the components used in Examples 1 to 3. The phase difference Re in the in-plane direction and the phase difference Rth in the thickness direction in Tables 1 to 3 and Tables 4 and 5 described later are determined by the following equations:

Phase difference $Re$ in in-plane direction$=(nx-ny)\times d$; and

Phase difference $Rth$ in thickness direction$=(nz-(nx+ny)/2)d$.

In the equations, nx and ny each represent a principal refractive index in the in-plane direction of a phase difference layer; nz represents a principal refractive index in the out-of-plane direction, i.e., the direction vertical to a surface of the liquid crystal layer; and d represents the thickness of the liquid crystal layer. In the equations, nx>ny is satisfied. The axial azimuth of nx is called the slow axis, and the axial azimuth of ny is called the fast axis.

In Tables 1 to 3 and Tables 4 and 5 described later, the phase difference in the in-plane direction of the shutter liquid crystal panel is the phase difference in the in-plane direction of the liquid crystal layer in the state with no voltage applied, and the axial azimuth is the slow axis of the liquid crystal layer in the state with no voltage applied (initial alignment azimuth of liquid crystal molecules). For polarizing plates, the axis azimuth of the absorption axis is shown. For phase difference layers, the axis azimuth of the slow axis is shown. For positive C plates and negative C plates, the symbol "−" is shown because their optic axis coincides with the normal direction and the in-plane slow axis is not defined.

|$Rth_1-Rth_2$| of Examples 1 to 4 were respectively set to 150 nm, 130 nm, 140 nm, and 120 nm, wherein $Rth_1$ is a phase difference introduced by the right-eye polarizer or the left-eye polarizer in the thickness direction at a wavelength of 550 nm, whichever is greater; and $Rth_2$ is a phase difference introduced by the right-eye polarizer or the left-eye polarizer in the thickness direction at a wavelength of 550 nm, whichever is smaller.

TABLE 1

|  |  | Phase difference | | Axial azimuth | |
| --- | --- | --- | --- | --- | --- |
| Example 1 | Component name | Right eye | Left eye | Right eye | Left eye |
| 3D glasses | First polarizing plate | — | | 90° | |
|  | First λ/4 plate | Re = 138 nm | | −45° | 45° |
|  | Phase difference layer | Rth = 110 nm | Rth = −40 nm | — | — |
| Liquid crystal shutter | Shutter liquid crystal panel | Re = 275 nm | | 45° | |
|  | Second λ/4 plate | Re = 138 nm | | −45° | |
| Image display device | Second polarizing plate | — | | 0° | |

TABLE 2

| Example 2 | Component name | Phase difference | | Axial azimuth | |
|---|---|---|---|---|---|
| | | Right eye | Left eye | Right eye | Left eye |
| 3D glasses | First polarizing plate | — | | 90° | |
| | First λ/4 plate | Re = 138 nm | | −45° | 45° |
| | Phase difference layer | Rth = 80 nm | Rth = −50 nm | — | — |
| Liquid crystal shutter | Shutter liquid crystal panel | Re = 275 nm | | 45° | |
| | Second λ/4 plate | Re = 138 nm | | −45° | |
| Image display device | Second polarizing plate | — | | 0° | |

TABLE 3

| Example 3 | Component name | Phase difference | | Axial azimuth | |
|---|---|---|---|---|---|
| | | Right eye | Left eye | Right eye | Left eye |
| 3D glasses | First polarizing plate | — | | 90° | |
| | First λ/4 plate | Re = 138 nm | | −45° | 45° |
| | Phase difference layer | Rth = 120 nm | Rth = −20 nm | — | — |
| Liquid crystal shutter | Shutter liquid crystal panel | Re = 275 nm | | 45° | |
| | Second λ/4 plate | Re = 138 nm | | −45° | |
| Image display device | Second polarizing plate | — | | 0° | |

Example 4

The configuration of the three-dimensional image display device of Example 4 is the same as that in Example 1, except that the configuration of the 3D glasses is different. The 3D glasses of Example 4 have the configuration of Embodiment 2 shown in FIG. 5. The right-eye polarizer 11R and the left-eye polarizer 11L share one first polarizing plate 13 in the 3D glasses of Example 4. The right-eye polarizer 11R includes the first polarizing plate 13 and the first λ/4 plate 14R sequentially in this order from the viewer side, and the left-eye polarizer 11L includes the first polarizing plate 13, the first λ/4 plate 14L, and the phase difference layer 15L in this order from the viewer side. Table 4 shows the phase differences introduced by the components used in Example 4.

TABLE 4

| Example 4 | Component name | Phase difference | | Axial azimuth | |
|---|---|---|---|---|---|
| | | Right eye | Left eye | Right eye | Left eye |
| 3D glasses | First polarizing plate | — | | 90° | |
| | First λ/4 plate | Re = 138 nm | | 45° | −45° |
| | Phase difference layer | | Rth = −120 nm | | |
| Liquid crystal shutter | Shutter liquid crystal panel | Re = 275 nm | | 45° | |
| | Second λ/4 plate | Re = 138 nm | | −45° | |
| Image display device | Second polarizing plate | — | | 0° | |

Comparative Example 1

The configuration of the three-dimensional image display device of Comparative Example 1 is the same as that in Example 1, except that the configuration of the 3D glasses is different. The 3D glasses of Comparative Example 1 have the configuration shown in FIG. 9. The right-eye polarizer 111R and the left-eye polarizer 111L share one polarizing plate 113 in the 3D glasses of Comparative Example 1. The right-eye polarizer 111R includes the first λ/4 plate 114R and the left-eye polarizer 111L includes the first λ/4 plate 114L. Table 5 shows the phase differences introduced by the components used in Comparative Example 1.

TABLE 5

| Comparative Example 1 | Component name | Phase difference | | Axial azimuth | |
|---|---|---|---|---|---|
| | | Right eye | Left eye | Right eye | Left eye |
| 3D glasses | First polarizing plate | — | | 90° | |
| | First λ/4 plate | Re = 138 nm | | −45° | 45° |
| Liquid crystal shutter | Shutter liquid crystal panel | Re = 275 nm | | 45° | |
| | Second λ/4 plate | Re = 138 nm | | −45° | |
| Image display device | Second polarizing plate | — | | 0° | |

(Luminance Calculation)

In Examples 1 to 4 and Comparative Example 1, the luminances for the right eye and the left eye were calculated with the liquid crystal shutter in the state with no voltage applied (OFF) and in the state with voltage applied (ON). The luminance was calculated with a liquid crystal optical simulator (available from Shintech Co., Ltd., product name: LCD-MASTER) at polar angles of 0° to 80° and the azimuthal angle varied from 0° to 360°. The luminance was calculated with the image display device turned on (the backlight was turned on and the image-displaying panel was in a white display state). The polar angle means an angle formed by the normal direction, which is taken as 0°, of the surface of the 3D glasses on the viewer side and the measurement direction. This calculation is substantially the same as the calculation of the transmittance because the luminous intensity distribution of the light source is assumed to be 100 nt in all azimuths.

Figure 10:
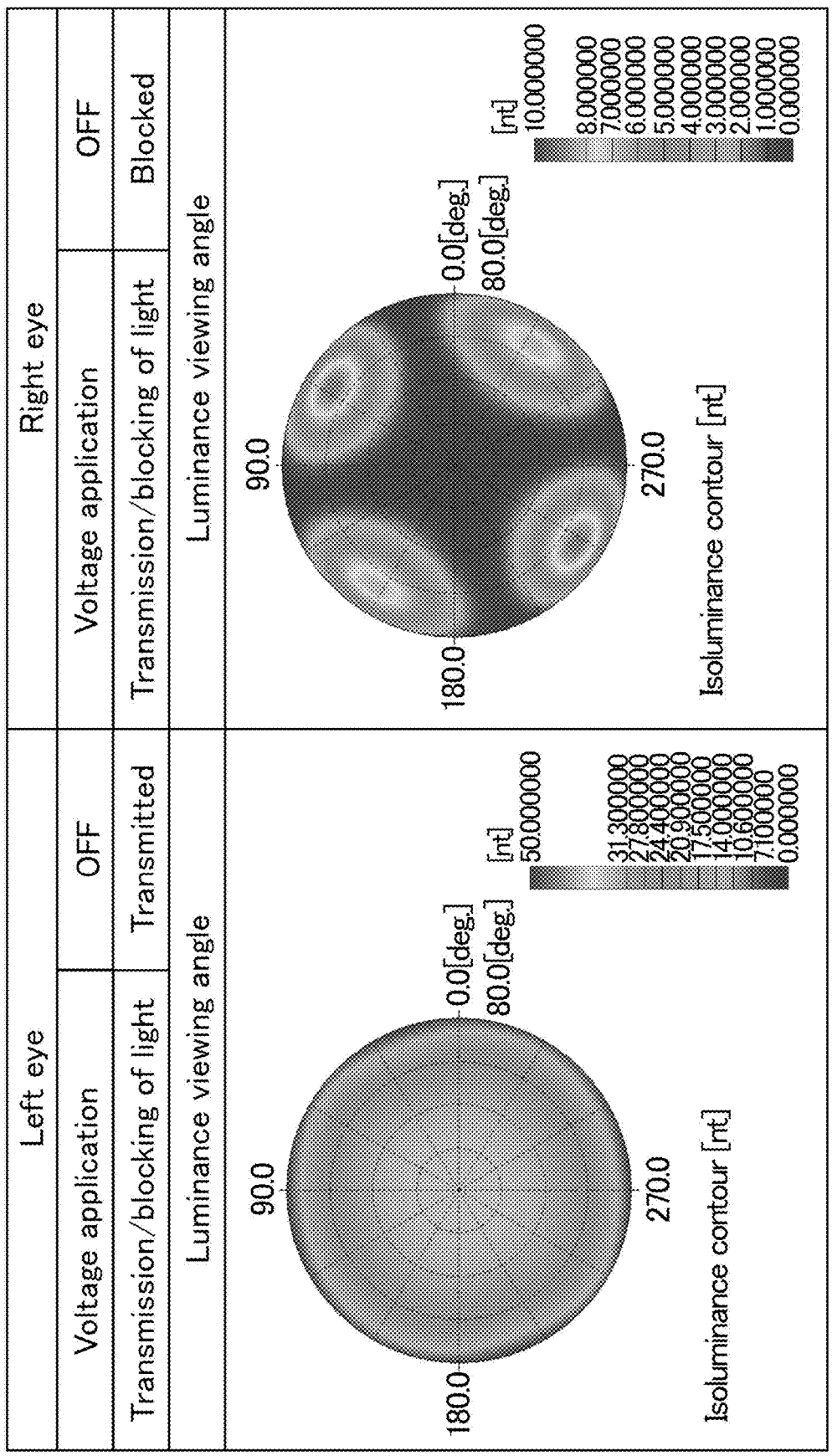
FIG. 10 includes a contour plot showing the luminance viewing angle for the right eye and a contour plot showing the luminance viewing angle for the left eye, with the liquid crystal shutter turned off in Example 1.
Figure 11:
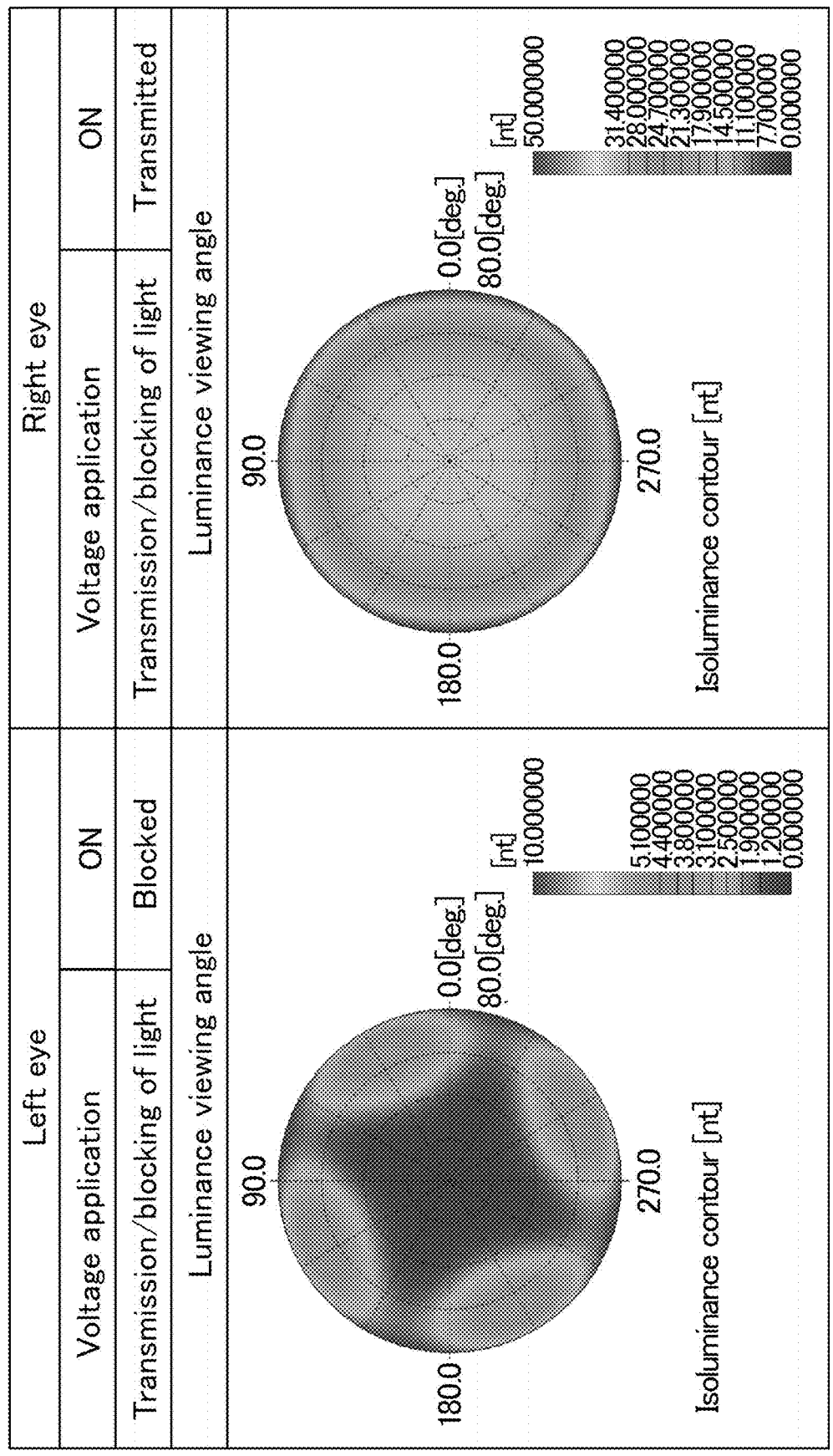
FIG. 11 includes a contour plot showing the luminance viewing angle for the right eye and a contour plot showing the luminance viewing angle for the left eye, with the liquid crystal shutter turned on in Example 1.
Figure 12:
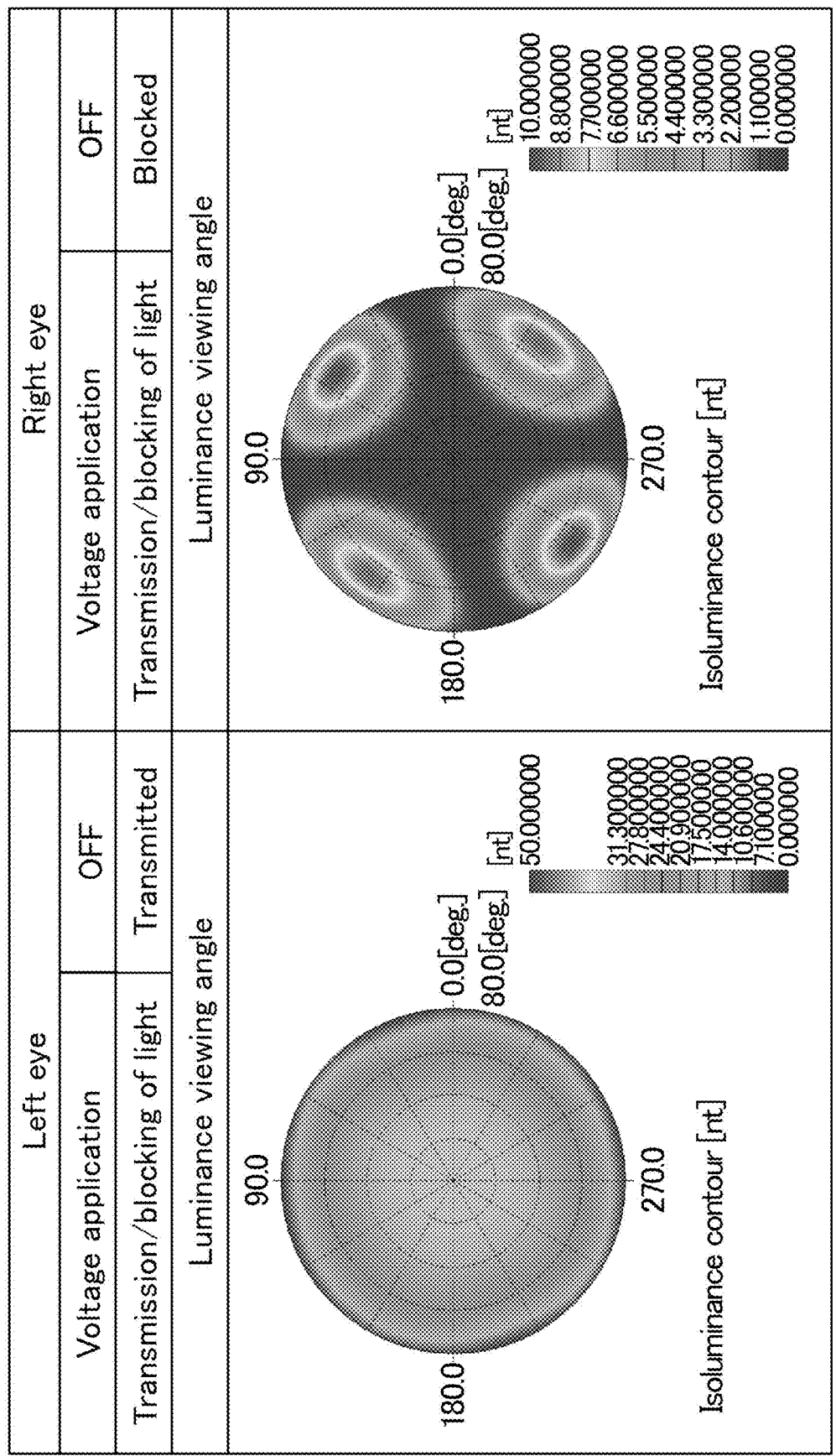
FIG. 12 includes a contour plot showing the luminance viewing angle for the right eye and a contour plot showing the luminance viewing angle for the left eye, with the liquid crystal shutter turned off in Example 2.
Figure 13:
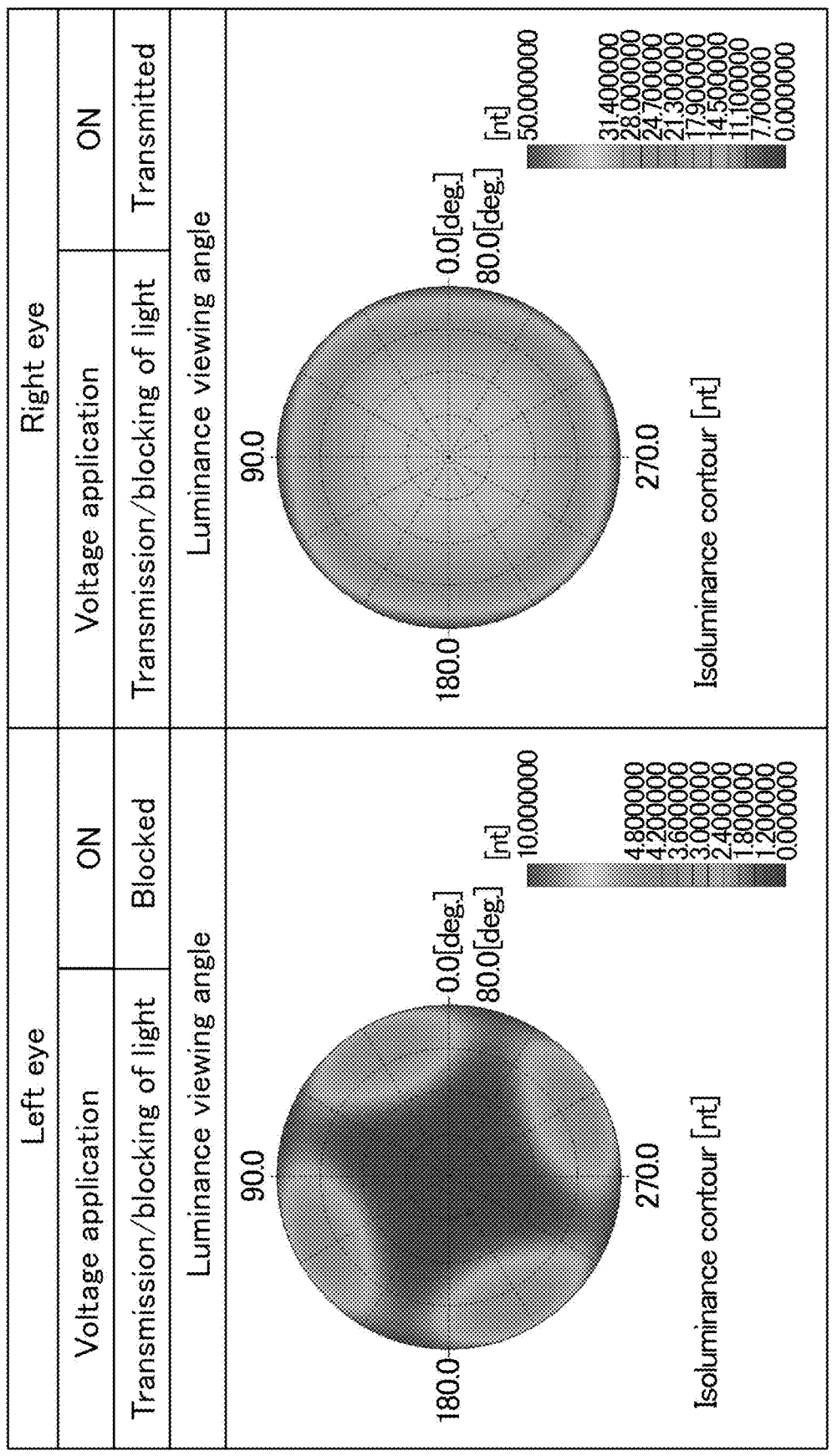
FIG. 13 includes a contour plot showing the luminance viewing angle for the right eye and a contour plot showing the luminance viewing angle for the left eye, with the liquid crystal shutter turned on in Example 2.
Figure 14:
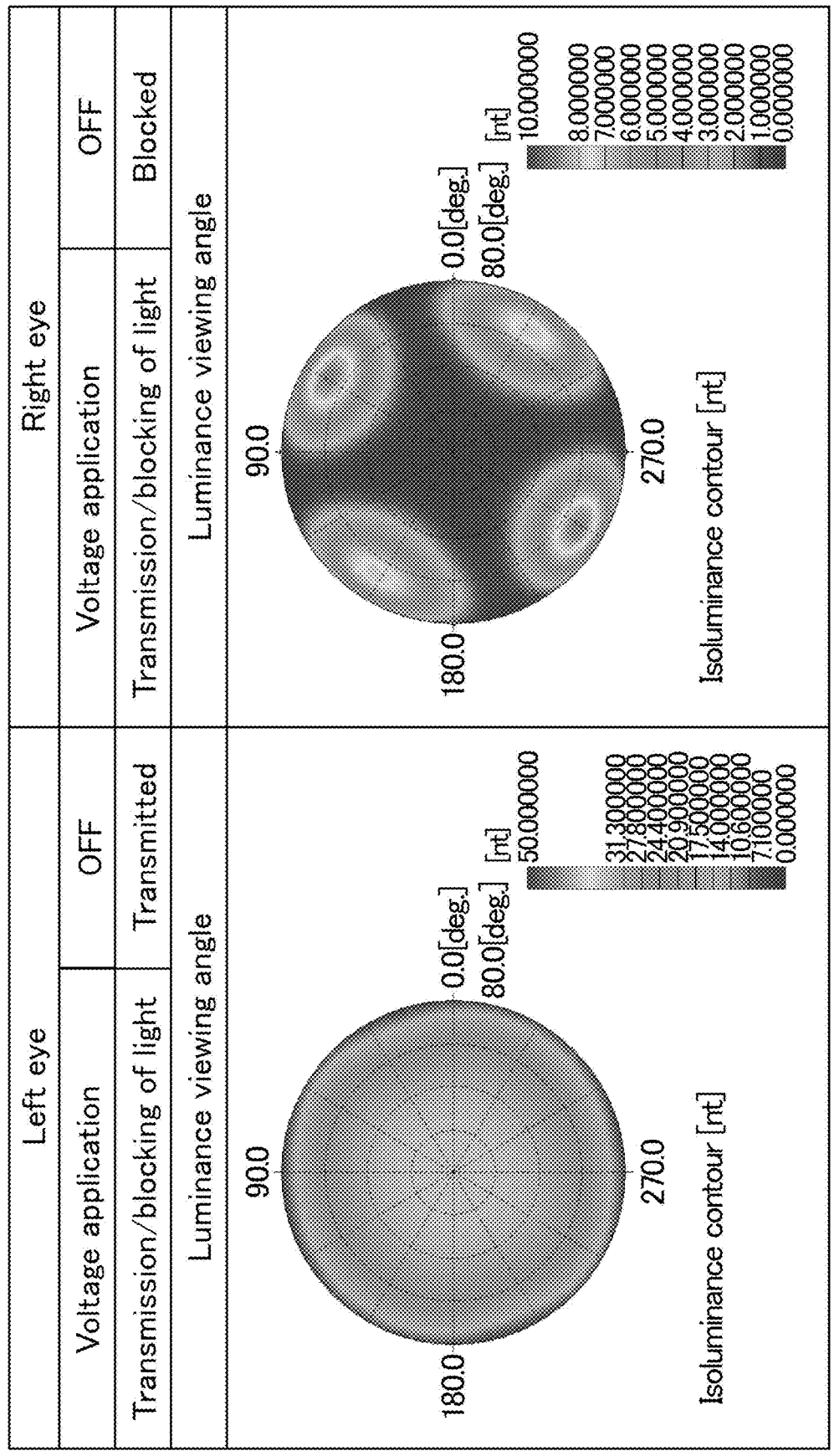
FIG. 14 includes a contour plot showing the luminance viewing angle for the right eye and a contour plot showing the luminance viewing angle for the left eye, with the liquid crystal shutter turned off in Example 3.
Figure 15:
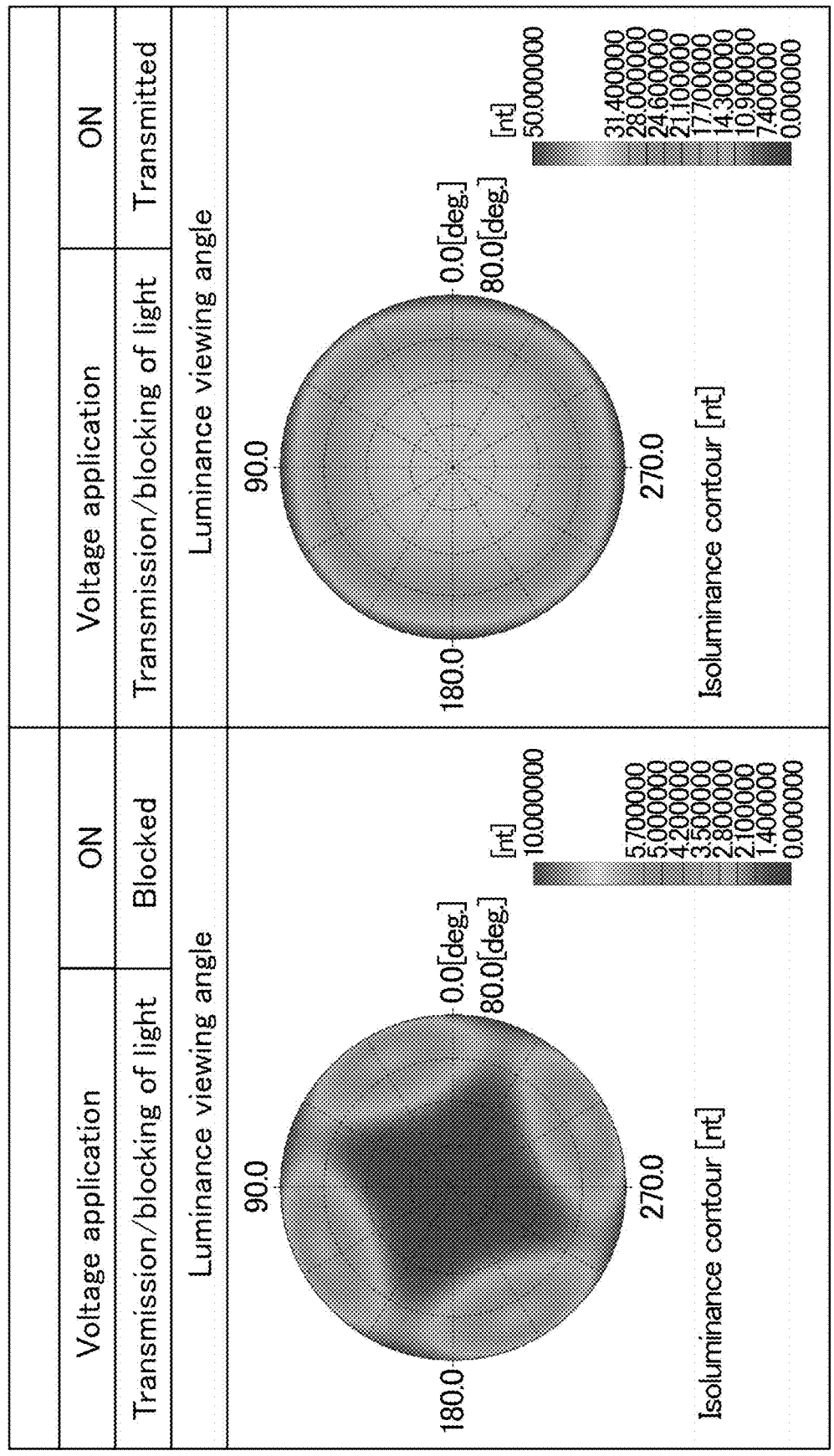
FIG. 15 includes a contour plot showing the luminance viewing angle for the right eye and a contour plot showing the luminance viewing angle for the left eye, with the liquid crystal shutter turned on in Example 3.
Figure 16:
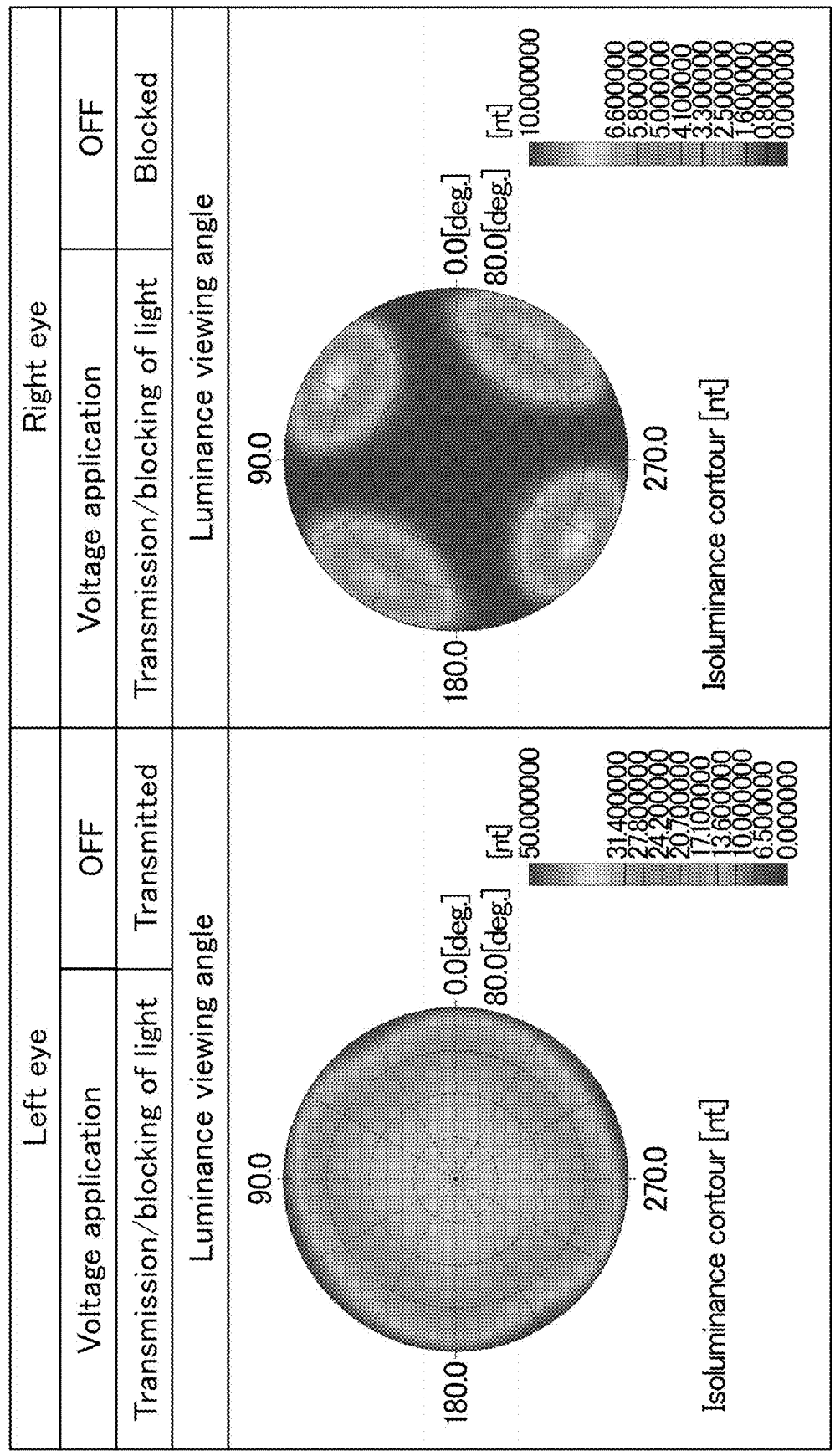
FIG. 16 includes a contour plot showing the luminance viewing angle for the right eye and a contour plot showing the luminance viewing angle for the left eye, with the liquid crystal shutter turned off in Example 4.
Figure 17:
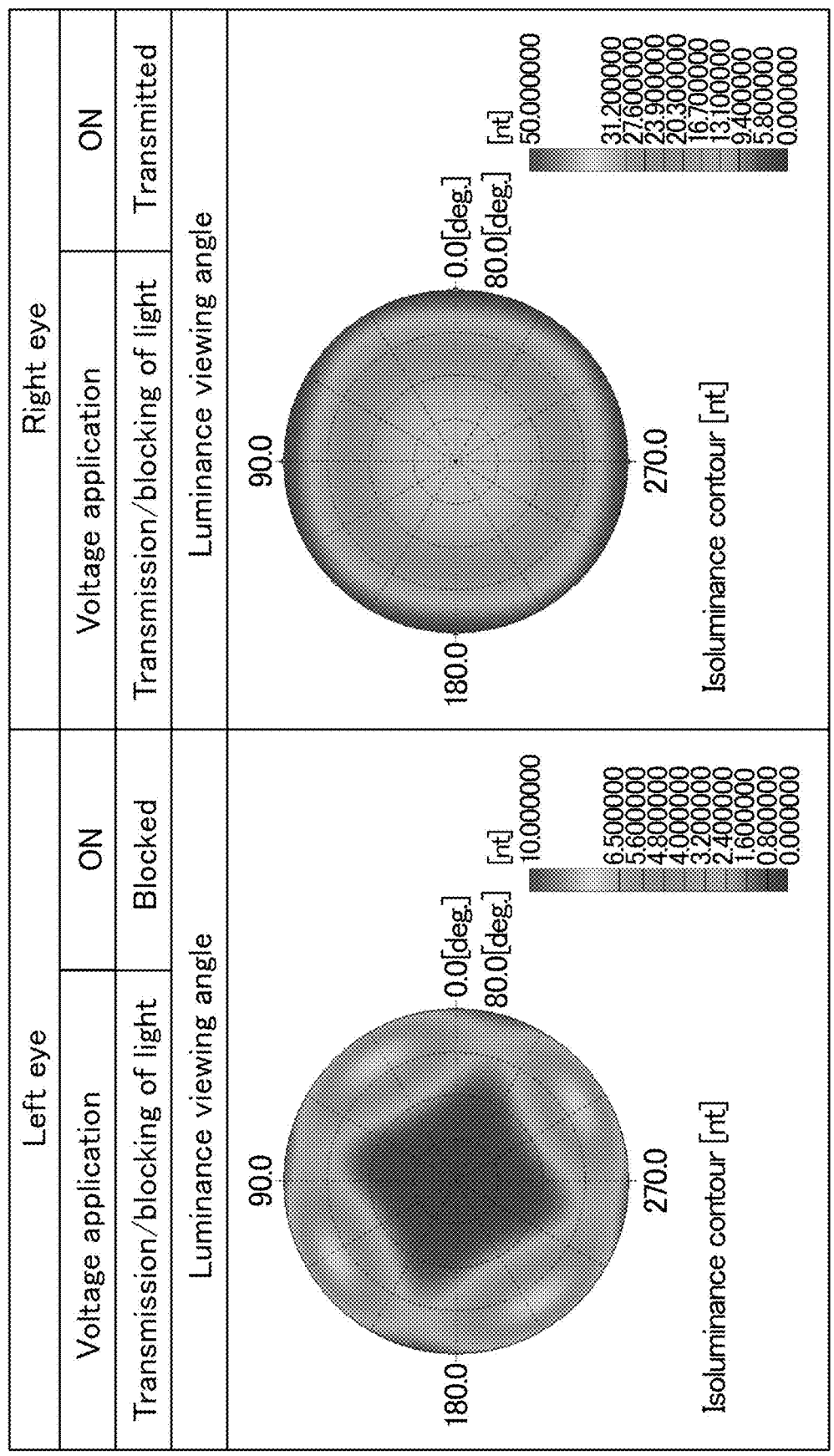
FIG. 17 includes a contour plot showing the luminance viewing angle for the right eye and a contour plot showing the luminance viewing angle for the left eye, with the liquid crystal shutter turned on in Example 4.

The results are shown in FIGS. 10 to 19. FIG. 10 includes a contour plot showing the luminance viewing angle for the right eye and a contour plot showing the luminance viewing angle for the left eye, both in the three-dimensional display device of Example 1 with the liquid crystal shutter turned off. FIG. 11 includes a contour plot showing the luminance viewing angle for the right eye and a contour plot showing the luminance viewing angle for the left eye, both in the three-dimensional display device of Example 1 with the liquid crystal shutter turned on. FIG. 12 includes a contour plot showing the luminance viewing angle for the right eye and a contour plot showing the luminance viewing angle for the left eye, both in the three-dimensional display device of Example 2 with the liquid crystal shutter turned off. FIG. 13 includes a contour plot showing the luminance viewing angle for the right eye and a contour plot showing the luminance viewing angle for the left eye, both in the three-dimensional display device of Example 2 with the liquid crystal shutter turned on. FIG. 14 includes a contour plot showing the luminance viewing angle for the right eye and a contour plot showing the luminance viewing angle for the left eye, both in the three-dimensional display device of Example 3 with the liquid crystal shutter turned off. FIG. 14 includes a contour plot showing the luminance viewing angle for the right eye and a contour plot showing the luminance viewing angle for the left eye, both in the three-dimensional display device of Example 3 with the liquid crystal shutter turned on. FIG. 16 includes a contour plot showing the luminance viewing angle for the right eye and a contour plot showing the luminance viewing angle for the left eye, both in the three-dimensional display device of Example 4 with the liquid crystal shutter turned off. FIG. 17 includes a contour plot showing the luminance viewing angle for the right eye and a contour plot showing the luminance viewing angle for the left eye, both in the three-dimensional display device of Example 4 with the liquid crystal shutter turned on. FIG. 18 includes a contour plot showing the luminance viewing angle for the right eye and a contour plot showing the luminance viewing angle for the left eye, both in the three-dimensional display device of Comparative Example 1 with the liquid crystal shutter turned off. FIG. 19 includes a contour plot showing the luminance viewing angle for the right eye and a contour plot showing the luminance viewing angle for the left eye, both in the three-dimensional display device of Comparative Example 1 with the liquid crystal shutter turned on. A contour plot shows the brightness levels where a higher value indicates a higher transmittance.

First, Comparative Example 1 was examined. The contour plot for the right eye in a state where light is blocked in FIG. 18 and the contour plot for the left eye in a state where light is blocked in FIG. 19 show that the luminance increased in oblique directions (at substantially 45°, substantially 135°, substantially 225°, and substantially 315° in FIG. 18, and at substantially 30°, substantially 120°, substantially 210°, and substantially 300° in FIG. 19). This indicates insufficient blocking of light in oblique directions, resulting in occurrence of crosstalk.

Next, Examples 1 to 4 were examined. As for Example 1, the contour plot for the right eye in a state where light is blocked in FIG. 10 and the contour plot for the left eye in a state where light is blocked in FIG. 10 were examined. As for Example 2, the contour plot for the right eye in a state where light is blocked in FIG. 12 and the contour plot for the left eye in a state where light is blocked in FIG. 13 were examined. As for Example 3, the contour plot for the right eye in a state where light is blocked in FIG. 14 and the contour plot for the left eye in a state where light is blocked in FIG. 15 were examined. As for Example 4, the contour plot for the right eye in a state where light is blocked in FIG. 16 and the contour plot for the left eye in a state where light is blocked in FIG. 17 were examined. It was confirmed that, in all of Examples 1 to 4, the transmittance in oblique directions in a state where light is blocked was lower than that in Comparative Example 1 to reduce or prevent light leakage, resulting in reduction of crosstalk.

REFERENCE SIGNS LIST 1, 101: three-dimensional image display device
10: 3D glasses
11R, 111R: right-eye polarizer
11L, 111L: left-eye polarizer
12: support
13, 13R, 13L, 113: polarizing plate (first polarizing plate)
14, 14R, 14L, 114R, 114L: first λ/4 plate
15, 15R, 15L: phase difference layer
20: liquid crystal shutter
21: shutter liquid crystal panel
22: second λ/4 plate
30: optical device
40: image display device
41: image-displaying panel
42: second polarizing plate
43: third polarizing plate
44: backlight unit
50: adhesive layer

What is claimed is:

1. 3D glasses comprising:
a right-eye polarizer; and
a left-eye polarizer,
the right-eye polarizer and the left-eye polarizer each comprising a polarizing plate and a first λ/4 plate,
at least one of the right-eye polarizer or the left-eye polarizer comprising a phase difference layer on or behind a back surface side of the polarizing plate,
wherein the phase difference layer is a positive C plate or a negative C plate providing a phase difference of 5 nm or less in an in-plane direction, and
a phase difference introduced by the right-eye polarizer in a thickness direction at a wavelength of 550 nm is different from a phase difference introduced by the left-eye polarizer in the thickness direction at a wavelength of 550 nm.

2. The 3D glasses according to claim 1,
wherein the right-eye polarizer and the left-eye polarizer satisfy the following formula (1):

$$|Rth_1 - Rth_2| \geq 120 \text{ nm} \qquad (1)$$

where $Rth_1$ is the phase difference introduced by the right-eye polarizer or the left-eye polarizer in the thickness direction at a wavelength of 550 nm, whichever is greater; $Rth_2$ is the phase difference introduced by the right-eye polarizer or the left-eye polarizer in the thickness direction at a wavelength of 550 nm, whichever is smaller; and $Rth_1 > Rth_2$.

3. The 3D glasses according to claim 1,
wherein the right-eye polarizer and the left-eye polarizer each include the phase difference layer, and
a phase difference introduced by the phase difference layer in the right-eye polarizer in the thickness direction at a wavelength of 550 nm has a value with a sign different from a sign of a value of a phase difference introduced by the phase difference layer in the left-eye polarizer in the thickness direction at a wavelength of 550 nm.

4. The 3D glasses according to claim 3,
wherein one of the phase difference layer in the right-eye polarizer and the phase difference layer in the left-eye polarizer is a positive C plate that provides a phase difference of 80 to 140 nm in absolute value in the thickness direction at a wavelength of 550 nm, and the other is a negative C plate that provides a phase difference of 20 to 120 nm in absolute value in the thickness direction at a wavelength of 550 nm.

5. The 3D glasses according to claim 1,
wherein one of the right-eye polarizer and the left-eye polarizer alone includes the phase difference layer.

6. An optical device comprising:
the 3D glasses according to claim 1; and
a liquid crystal shutter on or behind a back surface side of the 3D glasses,
the liquid crystal shutter comprising a liquid crystal panel that is time-divisionally driven and a second λ/4 plate on a back surface side of the liquid crystal panel.

7. A three-dimensional image display device comprising:
the optical device according to claim 6; and
an image display device on or behind a back surface side of the optical device,
the image display device comprising a pair of polarizing plates and an image-displaying panel sandwiched between the pair of polarizing plates.

8. The 3D glasses according to claim 1,
wherein the phase difference layer is a positive C plate that provides a phase difference of 80 to 140 nm in absolute value in the thickness direction at a wavelength of 550 nm, or a negative C plate that provides a phase difference of 20 to 120 nm in absolute value in the thickness direction at a wavelength of 550 nm.

* * * * *